US012684437B2

(12) United States Patent
Cheng et al.

(10) Patent No.: US 12,684,437 B2
(45) Date of Patent: Jul. 14, 2026

(54) TECHNIQUES FOR SIDELINK RELAY HANDOVER PROCEDURE

(71) Applicant: QUALCOMM Incorporated, San Diego, CA (US)

(72) Inventors: Peng Cheng, Beijing (CN); Karthika Paladugu, Hyderabad (IN); Hong Cheng, Basking Ridge, NJ (US); Gavin Bernard Horn, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 414 days.

(21) Appl. No.: 18/253,379

(22) PCT Filed: Jan. 14, 2021

(86) PCT No.: PCT/CN2021/071785
§ 371 (c)(1),
(2) Date: May 17, 2023

(87) PCT Pub. No.: WO2022/151164
PCT Pub. Date: Jul. 21, 2022

(65) Prior Publication Data
US 2024/0031888 A1 Jan. 25, 2024

(51) Int. Cl.
*H04W 36/00* (2009.01)
*H04W 48/12* (2009.01)

(52) U.S. Cl.
CPC ....... *H04W 36/0088* (2013.01); *H04W 48/12* (2013.01)

(58) Field of Classification Search
CPC . H04W 36/0088; H04W 48/12; H04W 88/04; H04W 36/0061; Y02D 30/70
See application file for complete search history.

(56) References Cited

U.S. PATENT DOCUMENTS

| | | | |
|---|---|---|---|
| 2019/0274121 A1 | 9/2019 | Wu et al. | |
| 2019/0313315 A1* | 10/2019 | Xu | H04W 24/10 |
| 2022/0116841 A1* | 4/2022 | Tenny | H04W 36/0009 |

FOREIGN PATENT DOCUMENTS

| | | |
|---|---|---|
| CN | 107889080 A | 4/2018 |
| CN | 109156005 A | 1/2019 |

(Continued)

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3GPP, Mobile Competence Centre, 650, Route Des Lucioles, F-06921, Sophia-Antipolis Cedex, France, vol. RAN WG2, No. V16.3.1, Jan. 7, 2021, pp. 1-932, XP051999705.

(Continued)

*Primary Examiner* — Habte Mered
(74) *Attorney, Agent, or Firm* — Holland & Hart LLP

(57) ABSTRACT

Methods, systems, and devices for wireless communications are described. A first user equipment (UE) may relay wireless communications between a first base station and a second UE via at least a sidelink communication link with the second UE. The first UE may transmit, to the first base station, a measurement report for one or more candidate base stations, the measurement report indicating that the one or more candidate base stations support sidelink relay operation. The first UE may receive instructions to perform a handover procedure from the first base station to a second base station of the one or more candidate base stations based on the measurement report, where the second base station supports sidelink relay operation. The first UE may then perform the handover procedure including establishing a wireless connection with the second base station based on the instructions.

27 Claims, 12 Drawing Sheets

(56) References Cited

FOREIGN PATENT DOCUMENTS

| | | | |
|---|---|---|---|
| CN | 111757415 | A | 10/2020 |
| EP | 3445088 | A1 | 2/2019 |

OTHER PUBLICATIONS

International Search Report and Written Opinion—PCT/CN2021/071785—ISA/EPO—Jun. 29, 2021.

Intel Corporation: "On Sidelink Discovery for Relaying", 3GPP TSG RAN WG2 Meeting #111-e, R2-2006931, Electronic meeting, Aug. 17, 2020-Aug. 28, 2020, Aug. 7, 2020, 10 pages, Section 2.

* cited by examiner

L2 Relay: Control Plane Protocol Stack
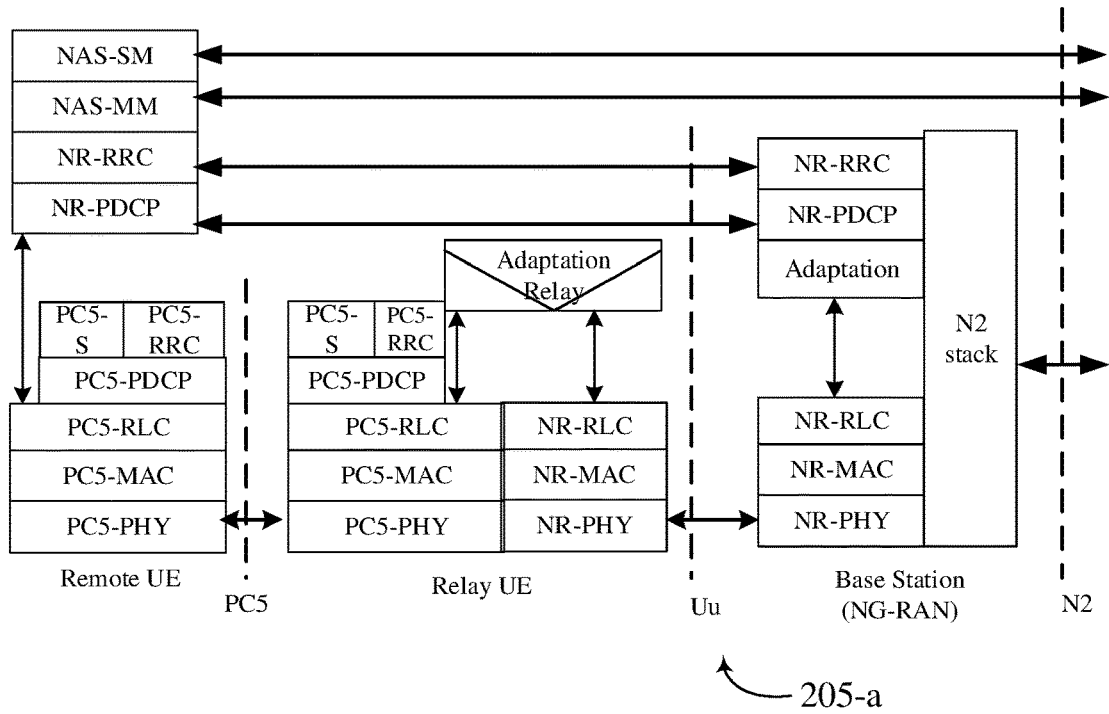
L2 Relay: User Plane Protocol Stack
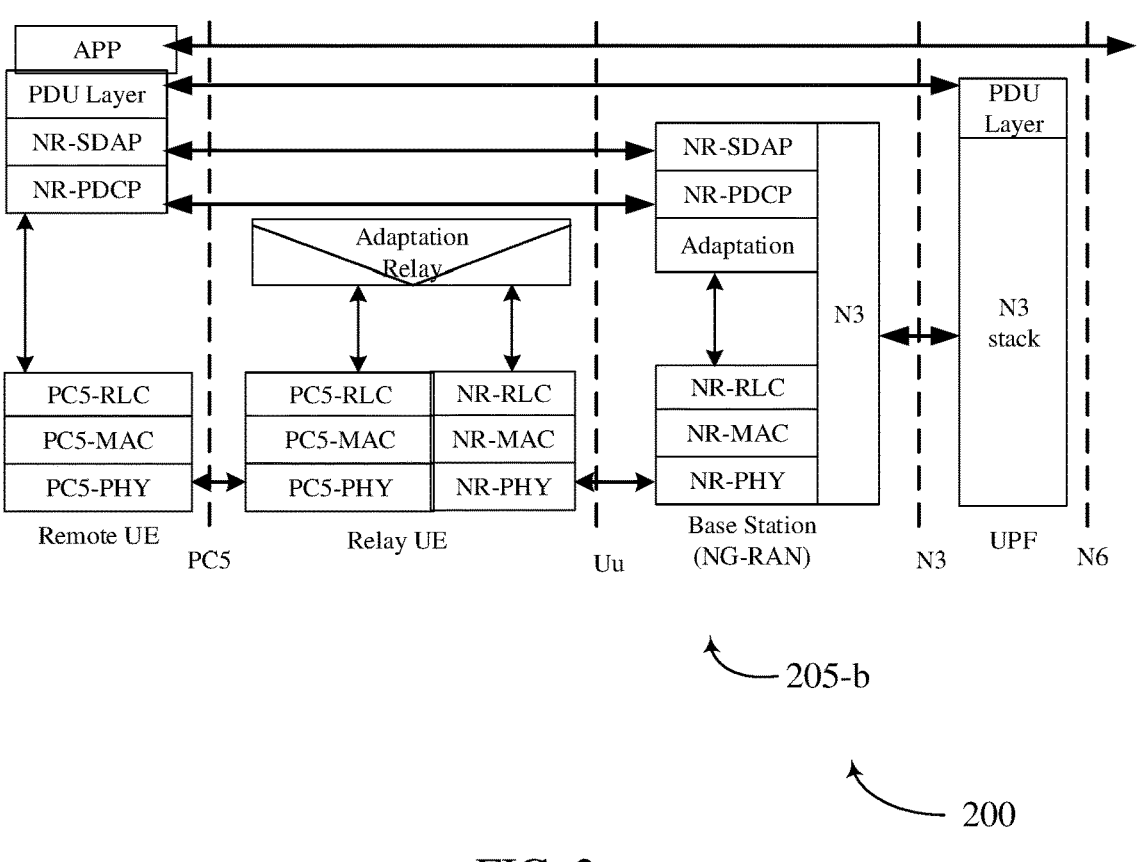
FIG. 2

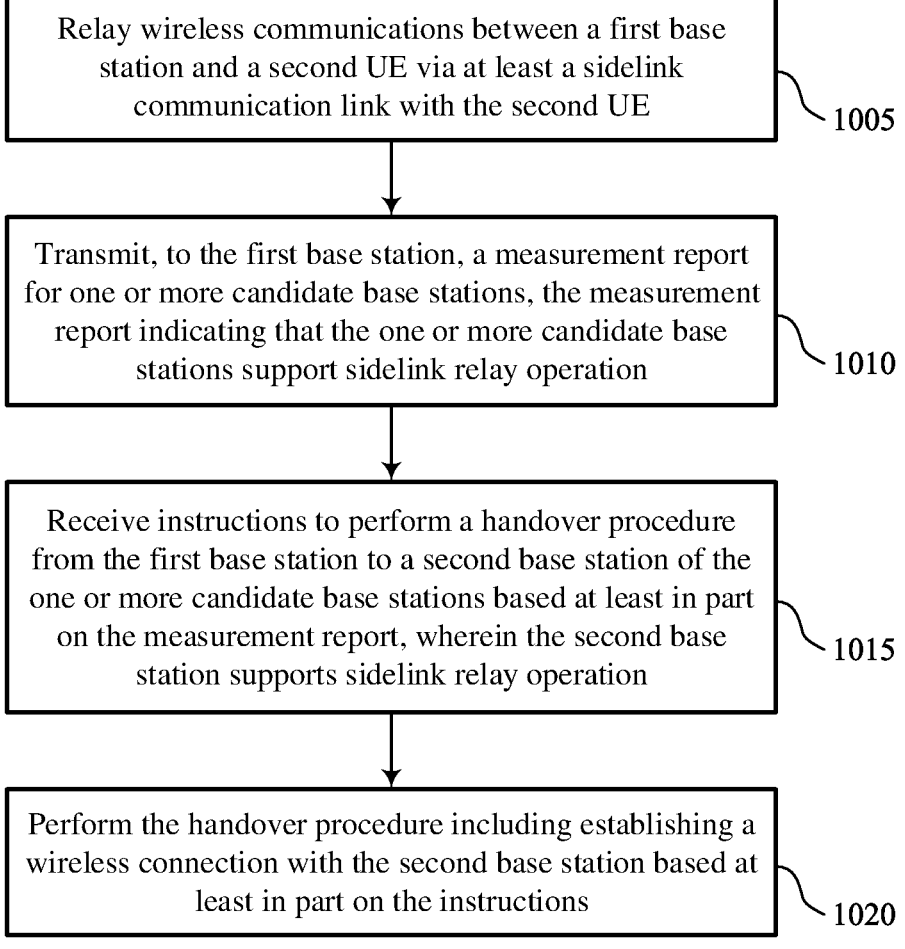

Relay wireless communications between a first base station and a second UE via at least a sidelink communication link with the second UE

1005

Transmit, to the first base station, a measurement report for one or more candidate base stations, the measurement report indicating that the one or more candidate base stations support sidelink relay operation

1010

Receive instructions to perform a handover procedure from the first base station to a second base station of the one or more candidate base stations based at least in part on the measurement report, wherein the second base station supports sidelink relay operation

1015

Perform the handover procedure including establishing a wireless connection with the second base station based at least in part on the instructions

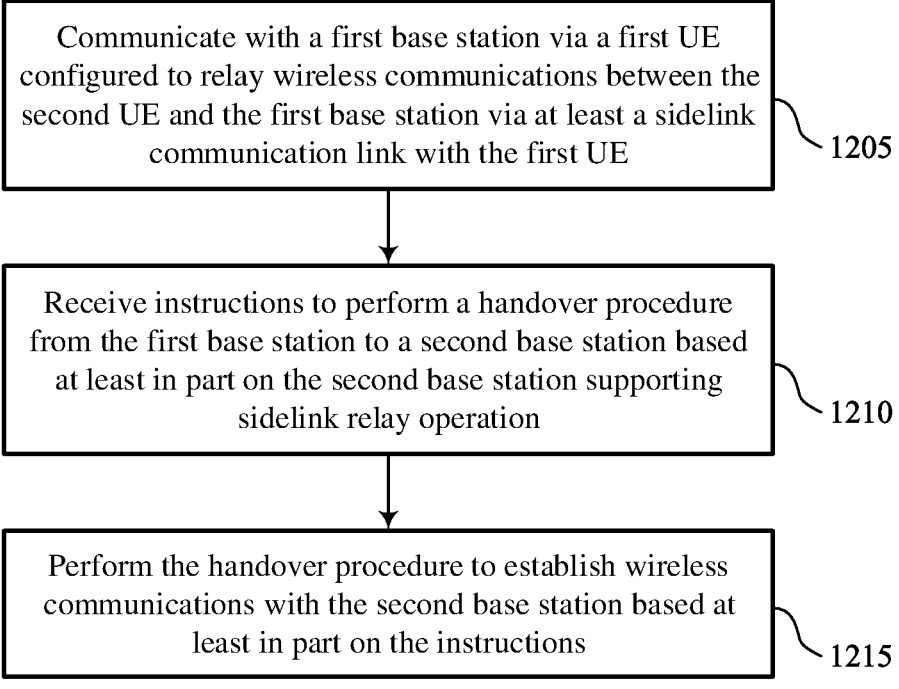

Communicate with a first base station via a first UE configured to relay wireless communications between the second UE and the first base station via at least a sidelink communication link with the first UE

1205

Receive instructions to perform a handover procedure from the first base station to a second base station based at least in part on the second base station supporting sidelink relay operation

1210

Perform the handover procedure to establish wireless communications with the second base station based at least in part on the instructions

TECHNIQUES FOR SIDELINK RELAY HANDOVER PROCEDURE

CROSS REFERENCE

The present Application is a 371 national stage filing of International PCT Application No. PCT/CN2021/071785 by CHENG et al. entitled "TECHNIQUES FOR SIDELINK RELAY HANDOVER PROCEDURE," filed Jan. 14, 2021, which is assigned to the assignee hereof, and which is expressly incorporated by reference in its entirety herein.

FIELD OF TECHNOLOGY

The following relates to wireless communications, including techniques for sidelink relay handover procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink relays in which a relay UE may forward, or relay, wireless communications between a base station and a remote UE. Among other advantages, the use of sidelink relays may enable remote UEs to reduce a transmission power of uplink transmissions, thereby reducing a power consumption at the remote UE. However, the use of sidelink relays may result in complexities in the context of performing cell handover procedures.

SUMMARY

The described techniques relate to improved methods, systems, devices, and apparatuses that support techniques for sidelink relay handover procedure. Generally, the described techniques which may be implemented by either relay user equipments (UEs) and/or remote UEs to identify whether target base stations support sidelink relay operations (e.g., whether the base station includes a sidelink-relay-capable base station or non-sidelink-relay-capable base station), which may help inform decisions for handover procedures. In particular, relay UEs and remote UEs may perform a handover procedure from a first base station to a second base station based on determining that the second base station supports sidelink relay operation. In some aspects, UEs (e.g., relay UEs, remote UEs) may determine whether base stations support sidelink relay operation based on system information block (SIB) messages received from the respective bases stations. In some cases, the SIB may indicate whether a base station supports sidelink relay operation explicitly (e.g., based on explicit bit fields within the SIB) and/or implicitly (e.g., based on identifying an absence of a sidelink relay configuration). In some cases, both relay UEs and remote UEs may control or influence which candidate base stations it will perform a handover procedure with based on measurement reports. For example, when transmitting measurement reports for candidate base stations, UEs may omit measurements for base stations which do not support sidelink relay operation, may indicate which base stations do not support sidelink relay operation, may indicate a preference for base stations which support sidelink relay operation, or any combination thereof.

A method for wireless communication at a first UE is described. The method may include relaying wireless communications between a first base station and a second UE via at least a sidelink communication link with the second UE, transmitting, to the first base station, a measurement report for one or more candidate base stations, the measurement report indicating that the one or more candidate base stations support sidelink relay operation, receiving instructions to perform a handover procedure from the first base station to a second base station of the one or more candidate base stations based on the measurement report, where the second base station supports sidelink relay operation, and performing the handover procedure including establishing a wireless connection with the second base station based on the instructions.

An apparatus for wireless communication at a first UE is described. The apparatus may include a processor, memory in electronic communication with the processor, and instructions stored in the memory. The instructions may be executable by the processor to cause the apparatus to relay wireless communications between a first base station and a second UE via at least a sidelink communication link with the second UE, transmit, to the first base station, a measurement report for one or more candidate base stations, the measurement report indicating that the one or more candidate base stations support sidelink relay operation, receive instructions to perform a handover procedure from the first base station to a second base station of the one or more candidate base stations based on the measurement report, where the second base station supports sidelink relay operation, and perform the handover procedure including establishing a wireless connection with the second base station based on the instructions.

Another apparatus for wireless communication at a first UE is described. The apparatus may include means for relaying wireless communications between a first base station and a second UE via at least a sidelink communication link with the second UE, means for transmitting, to the first base station, a measurement report for one or more candidate base stations, the measurement report indicating that the one or more candidate base stations support sidelink relay operation, means for receiving instructions to perform a handover procedure from the first base station to a second base station of the one or more candidate base stations based on the measurement report, where the second base station supports sidelink relay operation, and means for performing the handover procedure including establishing a wireless connection with the second base station based on the instructions.

A non-transitory computer-readable medium storing code for wireless communication at a first UE is described. The code may include instructions executable by a processor to relay wireless communications between a first base station and a second UE via at least a sidelink communication link with the second UE, transmit, to the first base station, a measurement report for one or more candidate base stations, the measurement report indicating that the one or more candidate base stations support sidelink relay operation, receive instructions to perform a handover procedure from the first base station to a second base station of the one or more candidate base stations based on the measurement report, where the second base station supports sidelink relay operation, and perform the handover procedure including establishing a wireless connection with the second base station based on the instructions.

Some examples of the method, apparatuses, and non-transitory computer-readable medium described herein may further include operations, features, means, or instructions for receiving a SIB message from at least one candidate base station of the one or more candidate base stations and determining, based on the SIB message, that the at least one candidate base station supports sidelink relay operation, where the first UE transmits the measurement report based on determining that the at least one candidate base station supports support sidelink relay operation.

Some examples of the method, apparatuses, and non-transitory computer-readable medium described herein may further include operations, features, means, or instructions for receiving, via the SIB message, one or more bit field values indicating that the at least one candidate base station supports sidelink relay operation, where the determining may be based on the one or more bit field values.

Some examples of the method, apparatuses, and non-transitory computer-readable medium described herein may further include operations, features, means, or instructions for determining that a third base station does not support sidelink relay operation, where transmitting the measurement report, performing the handover procedure, or both, may be based on determining that the third base station does not support sidelink relay operation.

Some examples of the method, apparatuses, and non-transitory computer-readable medium described herein may further include operations, features, means, or instructions for receiving, from the third base station, a SIB message, where determining that the third base station does not support sidelink relay operation may be based on the SIB message.

Some examples of the method, apparatuses, and non-transitory computer-readable medium described herein may further include operations, features, means, or instructions for determining that the third base station does not support sidelink relay operation may be based on identifying one or more bit fields within the SIB message indicating that the third base station does not support sidelink relay operation, identifying an absence of data within the SIB message which indicates that the third base station supports sidelink relay operation, or both.

In some examples of the method, apparatuses, and non-transitory computer-readable medium described herein, the measurement report omits measurements for the third base station based on the third base station not supporting side-link relay operation, and performing the handover procedure with the second base station may be based on the measurement report omitting measurements for the third base station.

Some examples of the method, apparatuses, and non-transitory computer-readable medium described herein may further include operations, features, means, or instructions for receiving, from the first base station, a radio resource control (RRC) message indicating for the first UE to omit measurements associated with base stations which do not support sidelink relay operation, where the first UE omits the measurements for the third base station based on the RRC message.

In some examples of the method, apparatuses, and non-transitory computer-readable medium described herein, transmitting the measurement report may include operations, features, means, or instructions for transmitting measurements for the third base station via the measurement report, where the measurement report includes an indication that the third base station does not support sidelink relay operation, where performing the handover procedure with the second base station may be based on the indication that the third base station does not support sidelink relay operation.

Some examples of the method, apparatuses, and non-transitory computer-readable medium described herein may further include operations, features, means, or instructions for receiving, from the first base station, an indication that the third base station does not support sidelink relay operation, where the determining may be based on the indication that the third base station does not support sidelink relay operation.

Some examples of the method, apparatuses, and non-transitory computer-readable medium described herein may further include operations, features, means, or instructions for determining a sidelink relay configuration associated with the first base station and performing a discovery procedure based on the determined sidelink relay configuration, where performing the handover procedure may be based on performing the discovery procedure.

Some examples of the method, apparatuses, and non-transitory computer-readable medium described herein may further include operations, features, means, or instructions for receiving a SIB message from the first base station, where determining the sidelink relay configuration associated with the first base station may be based on the SIB message.

In some examples of the method, apparatuses, and non-transitory computer-readable medium described herein, the one or more candidate base stations support sidelink relay operation by supporting sidelink relay discovery procedures, sidelink relay transmissions, or both.

Some examples of the method, apparatuses, and non-transitory computer-readable medium described herein may further include operations, features, means, or instructions for communicating with the second base station within a first frequency range, determining a third base station supports sidelink relay operation within a second frequency range which may be different from the first frequency range, determining a sidelink relay configuration associated with the third base station based on the third base station supporting sidelink relay operation within the second frequency range, and performing a discovery procedure associated with the third base station in accordance with the sidelink relay configuration.

Some examples of the method, apparatuses, and non-transitory computer-readable medium described herein may further include operations, features, means, or instructions for receiving sidelink relay configuration, communicating with the second base station within a first frequency range, determining an absence of base stations configured to communicate within a second frequency range which may be different from the first frequency range, and performing a discovery procedure within the second frequency range and in accordance with the sidelink relay configuration.

A method for wireless communication at a second UE is described. The method may include communicating with a first base station via a first UE configured to relay wireless communications between the second UE and the first base station via at least a sidelink communication link with the first UE, receiving instructions to perform a handover procedure from the first base station to a second base station based on the second base station supporting sidelink relay operation, and performing the handover procedure to establish wireless communications with the second base station based on the instructions.

An apparatus for wireless communication at a second UE is described. The apparatus may include a processor, memory in electronic communication with the processor, and instructions stored in the memory. The instructions may be executable by the processor to cause the apparatus to communicate with a first base station via a first UE configured to relay wireless communications between the second UE and the first base station via at least a sidelink communication link with the first UE, receive instructions to perform a handover procedure from the first base station to a second base station based on the second base station supporting sidelink relay operation, and perform the handover procedure to establish wireless communications with the second base station based on the instructions.

Another apparatus for wireless communication at a second UE is described. The apparatus may include means for communicating with a first base station via a first UE configured to relay wireless communications between the second UE and the first base station via at least a sidelink communication link with the first UE, means for receiving instructions to perform a handover procedure from the first base station to a second base station based on the second base station supporting sidelink relay operation, and means for performing the handover procedure to establish wireless communications with the second base station based on the instructions.

A non-transitory computer-readable medium storing code for wireless communication at a second UE is described. The code may include instructions executable by a processor to communicate with a first base station via a first UE configured to relay wireless communications between the second UE and the first base station via at least a sidelink communication link with the first UE, receive instructions to perform a handover procedure from the first base station to a second base station based on the second base station supporting sidelink relay operation, and perform the handover procedure to establish wireless communications with the second base station based on the instructions.

Some examples of the method, apparatuses, and non-transitory computer-readable medium described herein may further include operations, features, means, or instructions for transmitting, to the first base station via the first UE, a measurement report for one or more candidate base stations, the measurement report indicating that the one or more candidate base stations support sidelink relay operation, where performing the handover procedure may be based on transmitting the measurement report.

Some examples of the method, apparatuses, and non-transitory computer-readable medium described herein may further include operations, features, means, or instructions for receiving a SIB message from at least one candidate base station of the one or more candidate base stations and determining, based on the SIB message, that the at least one base station supports sidelink relay operation, where the second UE transmits the measurement report based on determining that the at least one candidate base station supports support sidelink relay operation.

Some examples of the method, apparatuses, and non-transitory computer-readable medium described herein may further include operations, features, means, or instructions for receiving, via the SIB message, one or more bit field values indicating that the at least one candidate base station supports sidelink relay operation, where the determining may be based on the one or more bit field values.

Some examples of the method, apparatuses, and non-transitory computer-readable medium described herein may further include operations, features, means, or instructions for determining that a third base station does not support sidelink relay operation, where transmitting the measurement report, performing the handover procedure, or both, may be based on determining that the third base station does not support sidelink relay operation.

Some examples of the method, apparatuses, and non-transitory computer-readable medium described herein may further include operations, features, means, or instructions for receiving, from the third base station, a SIB message, where determining that the third base station does not support sidelink relay operation may be based on the SIB message.

Some examples of the method, apparatuses, and non-transitory computer-readable medium described herein may further include operations, features, means, or instructions for determining that the third base station does not support sidelink relay operation may be based on identifying one or more bit fields within the SIB message indicating that the third base station does not support sidelink relay operation, identifying an absence of data within the SIB message which indicates that the third base station supports sidelink relay operation, or both.

In some examples of the method, apparatuses, and non-transitory computer-readable medium described herein, the measurement report omits measurements for the third base station based on the third base station not supporting sidelink relay operation, and performing the handover procedure with the second base station may be based on the measurement report omitting measurements for the third base station.

Some examples of the method, apparatuses, and non-transitory computer-readable medium described herein may further include operations, features, means, or instructions for receiving, from the first base station via the first UE, an RRC message indicating for the second UE to omit measurements associated with base stations which do not support sidelink relay operation, where the second UE omits the measurements for the third base station based on the RRC message.

Some examples of the method, apparatuses, and non-transitory computer-readable medium described herein may further include operations, features, means, or instructions for receiving a policy control function message indicating for the second UE to omit measurements associated with base stations which do not support sidelink relay operation, where the second UE omits the measurements for the third base station based on the policy control function message.

In some examples of the method, apparatuses, and non-transitory computer-readable medium described herein, transmitting the measurement report may include operations, features, means, or instructions for transmitting measurements for the third base station via the measurement report, where the measurement report includes an indication that the third base station does not support sidelink relay operation, where performing the handover procedure with the second base station may be based on the indication that the third base station does not support sidelink relay operation.

Some examples of the method, apparatuses, and non-transitory computer-readable medium described herein may further include operations, features, means, or instructions for receiving, from the first base station via the first UE, an indication that the third base station does not support sidelink relay operation, where the determining may be based on the indication that the third base station does not support sidelink relay operation.

Some examples of the method, apparatuses, and non-transitory computer-readable medium described herein may further include operations, features, means, or instructions for determining that a third base station may be not associated with UEs which may be configured to relay wireless communions between the third base station and one or more additional UEs and transmitting the measurement report where the measurement report omits measurements for the third base station based on determining that the third base station may be not associated with UEs which may be configured to relay wireless communions between the third base station and the one or more additional UEs.

Some examples of the method, apparatuses, and non-transitory computer-readable medium described herein may further include operations, features, means, or instructions for transmitting, via the measurement report, an indication of a priority associated with base stations which support sidelink relay operation, where performing the handover procedure may be based on the priority.

Some examples of the method, apparatuses, and non-transitory computer-readable medium described herein may further include operations, features, means, or instructions for determining a sidelink relay configuration associated with the first base station and performing a discovery procedure based on the determined sidelink relay configuration, where performing the handover procedure may be based on performing the discovery procedure.

Some examples of the method, apparatuses, and non-transitory computer-readable medium described herein may further include operations, features, means, or instructions for receiving a SIB message from the first base station, where determining the sidelink relay configuration associated with the first base station may be based on the SIB message.

Some examples of the method, apparatuses, and non-transitory computer-readable medium described herein may further include operations, features, means, or instructions for transmitting, to a third base station, a handover request for a second handover procedure from the first base station to the third base station, where the third base station does not support sidelink relay operation and receiving, from the third base station, a control message rejecting the handover request, where performing the handover procedure from the first base station to the second base station may be based on receiving the control message.

Some examples of the method, apparatuses, and non-transitory computer-readable medium described herein may further include operations, features, means, or instructions for performing a relay UE reselection procedure from the first UE to a third UE and communicating with the first base station via the third UE based on performing the relay UE reselection procedure, where the third UE may be configured to relay wireless communications between the second UE and the first base station via at least a sidelink communication link between the first UE and the third UE.

In some examples of the method, apparatuses, and non-transitory computer-readable medium described herein, the second base station supports sidelink relay operation by supporting sidelink relay discovery procedures, sidelink relay transmissions, or both.

Some examples of the method, apparatuses, and non-transitory computer-readable medium described herein may further include operations, features, means, or instructions for communicating with the second base station within a first frequency range, determining a third base station supports sidelink relay operation within a second frequency range which may be different from the first frequency range, determining a sidelink relay configuration associated with the third base station based on the third base station supporting sidelink relay operation within the second frequency range, and performing a discovery procedure associated with the third base station in accordance with the sidelink relay configuration.

Some examples of the method, apparatuses, and non-transitory computer-readable medium described herein may further include operations, features, means, or instructions for receiving sidelink relay configuration, communicating with the second base station within a first frequency range, determining an absence of base stations configured to communicate within a second frequency range which may be different from the first frequency range, and performing a discovery procedure within the second frequency range and in accordance with the sidelink relay configuration.

BRIEF DESCRIPTION OF THE DRAWINGS

FIG. 2 illustrates an example of a relay configuration that supports techniques for sidelink relay handover procedure in accordance with aspects of the present disclosure.

FIGS. 10 through 12 show flowcharts illustrating methods that support techniques for sidelink relay handover procedure in accordance with aspects of the present disclosure.

DETAILED DESCRIPTION

Figure 1:
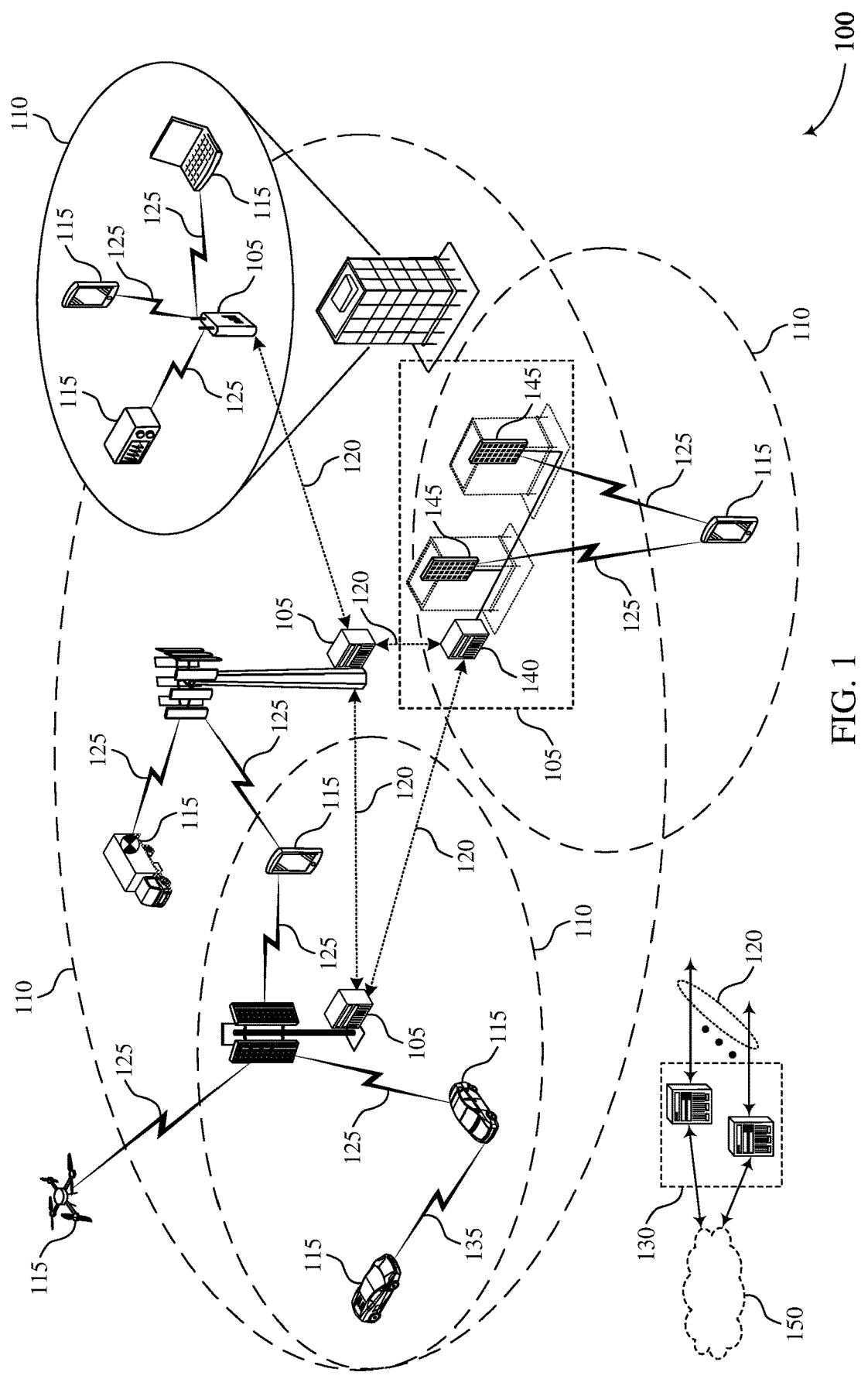
FIG. 1 illustrates an example of a wireless communications system that supports techniques for sidelink relay handover procedure in accordance with aspects of the present disclosure.

Some wireless systems may support sidelink relays in which a relay user equipment (UE) may forward, or relay, wireless communications between a base station and a remote UE. Among other advantages, the use of sidelink relays may enable remote UEs to reduce a transmission power of uplink transmissions, thereby reducing a power consumption at the remote UE. However, the use of sidelink relays may result in complexities in the context of performing cell handover procedures from one base station to another.

The complexities of performing cell handover procedures with sidelink relays may be further caused by the fact that not all base stations in a wireless communications system may support sidelink relay operation. For example, some base stations may support sidelink relay operation (e.g., SL-RelayCapableBSs), while others may not support sidelink relay operation (e.g., non-SL-RelayCapableBSs). For the purposes of the present disclosure, a base station may be considered to support sidelink relay operation if the base station is associated with a sidelink relay configuration, supports sidelink relay transmissions, supports sidelink relay discovery procedures (e.g., may provide a sidelink relay discovery configuration), or any combination thereof, within a single carrier. Conversely, for the purposes of the present disclosure, a base station which does not support sidelink relay configuration may not be associated with a sidelink relay configuration, may not support sidelink relay discovery procedures and/or sidelink relay transmissions, or any combination thereof.

In some wireless communications systems, relay UEs may only connect to base stations which support sidelink relay operation (e.g., SL-RelayCapableBSs), thereby limiting a quantity of base stations with which relay UEs may perform handover procedures. Furthermore, remote UEs may prefer to perform handover procedures to base stations which support sidelink relay operation (e.g., SL-RelayCapableBSs). However, some wireless communications systems do not provide signaling or techniques which enable relay UEs and/or remote UEs to identify which base stations support sidelink relay operation, and which do not.

Accordingly, techniques described herein are directed to signaling and other configurations which may enable relay UEs and/or remote UEs to identify whether target base stations support sidelink relay operations (e.g., whether a base station includes an SL-RelayCapableBS or a non-SL-RelayCapableBS), which may help inform decisions for handover procedures. In particular, relay UEs and remote UEs may perform a handover procedure from a first base station to a second base station based on determining that the second base station supports sidelink relay operation.

In some aspects, UEs (e.g., relay UEs, remote UEs) may determine whether base stations support sidelink relay operation based on system information block (SIB) messages received from the respective bases stations. In some cases, the SIB may indicate whether a base station supports sidelink relay operation explicitly (e.g., based on explicit bit fields within the SIB) and/or implicitly (e.g., based on identifying an absence of a sidelink relay configuration). In some cases, both relay UEs and remote UEs may control or influence which candidate base stations it will perform a handover procedure with based on measurement reports. For example, when transmitting measurement reports for candidate base stations, UEs may omit measurements for base stations which do not support sidelink relay operation, may indicate which base stations are do not support sidelink relay operation, may indicate a preference for base stations which support sidelink relay operation, or any combination thereof.

Aspects of the disclosure are initially described in the context of wireless communications systems. Additional aspects of the disclosure are described in the context of an example relay configuration and example process flows. Aspects of the disclosure are further illustrated by and described with reference to apparatus diagrams, system diagrams, and flowcharts that relate to techniques for sidelink relay handover procedure.

FIG. 1 illustrates an example of a wireless communications system 100 that supports techniques for sidelink relay handover procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support signaling and other techniques which may enable relay UEs 115 and/or remote UEs 115 to identify whether target base stations 105 support sidelink relay operations (e.g., whether a base station 105 includes an SL-RelayCapableBS or a non-SL-RelayCapableBS), which may help inform decisions for handover procedures. In particular, relay UEs 115 and remote UEs 115 may perform a handover procedure from a first base station 105 to a second base station 105 based on determining that the second base station 105 supports sidelink relay operation.

In some aspects, UEs 115 (e.g., relay UEs 115, remote UEs 115) of the wireless communications system 100 may determine whether base stations 105 support sidelink relay operation based on SIB messages received from the respective bases stations 105. In some cases, the SIB may indicate whether a base station 105 supports sidelink relay operation explicitly (e.g., based on explicit bit fields within the SIB) and/or implicitly (e.g., based on identifying an absence of a sidelink relay configuration). Additionally, or alternatively, UEs 115 may determine whether base stations 105 support sidelink relay operation based on policy control function (PCF) signaling received from a core network.

In some cases, both relay UEs 115 and remote UEs 115 may control or influence which candidate base stations 105 it will perform a handover procedure with based on measurement reports. For example, when transmitting measurement reports for candidate base stations, UEs 115 may omit measurements for base stations 105 which do not support sidelink relay operation, may indicate which base stations 105 do not support sidelink relay operation, may indicate a preference for base stations 105 which support sidelink relay operation, or any combination thereof. In some aspects, UEs 115 may be configured (e.g., via RRC signaling) to tailor measurement reporting based on whether base stations 105 do or do not support sidelink relay operation.

Techniques described herein may enable improved handover procedures for both remote UEs 115 and relay UEs 115 in the context of wireless communications systems. In particular, techniques described herein may enable UEs 115 (e.g., relay UEs 115, remote UEs 115) to determine whether base stations 105 support sidelink relay operation or not, which may enable more informed decisions regarding handover procedures. By enabling UEs 115 to determine whether base stations 105 support sidelink relay operation, techniques described herein may enable UEs 115 to perform handover procedures with base stations which support sidelink relay operation, thereby providing for more widespread use of sidelink relays and reducing power consumption at remote UEs 115.

FIG. 2 illustrates an example of a relay configuration 200 that supports techniques for sidelink relay handover procedure in accordance with aspects of the present disclosure. The relay configuration 200 may implement, or be implemented by, aspects of the wireless communications system 100.

In some aspects, the relay configuration 200 illustrates relay schemes 205-a and 205-b for Layer 2 (L2) relay communications between a remote UE and a relay UE which is configured to relay communications between the remote UE and a base station. In particular, the relay scheme 205-a illustrates a control plane protocol stack for L2 relay, and the relay scheme 205-b illustrates a user plane protocol stack for L2 relay. The relay schemes 205 illustrate various signaling carried out throughout the protocol stacks of the various devices which is used to carry out the respective handovers.

In each of the relay schemes 205, a remote UE may be communicatively coupled to a relay UE via a PC5 link (e.g., sidelink communication link). The relay UE may be communicatively coupled to a base station via a Uu link (e.g., uplink/downlink communication link), and may be configured to relay wireless communications between the remote UE and the base station. The base station may be communicatively coupled to a user plane function (UPF) of a wireless communications system via an N3 interface, and the UPF may be coupled to the data network via an N6 interface.

In the context of the control plane protocol stack for L2 relay, the relay scheme 205-*a* illustrates both the PC5 C-plane and the NR Uu C-plane at the remote UE. The PC5 C-plane may be configured for setting up unicast links with the relay UE prior to relayed communications. In some aspects, the remote UE may support NR Uu access stratum (AS) and non-access stratum (NAS) connections above the PC5 radio link control (RLC) layer. In some aspects, the base station (e.g., NG-RAN) illustrated in the relay scheme 205-*a* may be configured to control the remote UE's PC5 link via the NR RRC layer. Additionally, an adaptation layer at the relay UE may be configured to support multiplexing traffic for multiple remote UEs on a Uu link between the relay UE and the base station.

Referring to the user plane protocol stack for L2 relay illustrated in the relay scheme 205 *b*, the relay may be performed below the PDCP layer. In particular, the relay UE may forward the PC5 bearer and the Uu bearer using an adaptation layer function. In some aspects, dedicated radio bearers (DRBs) of the remote UE may be controlled by the base station (e.g., NG-RAN). Additionally, in L2 relay, all traffic may terminate at the 5GC, and there may be no direct communication between the remote UE or to the relay UE.

Figure 3:
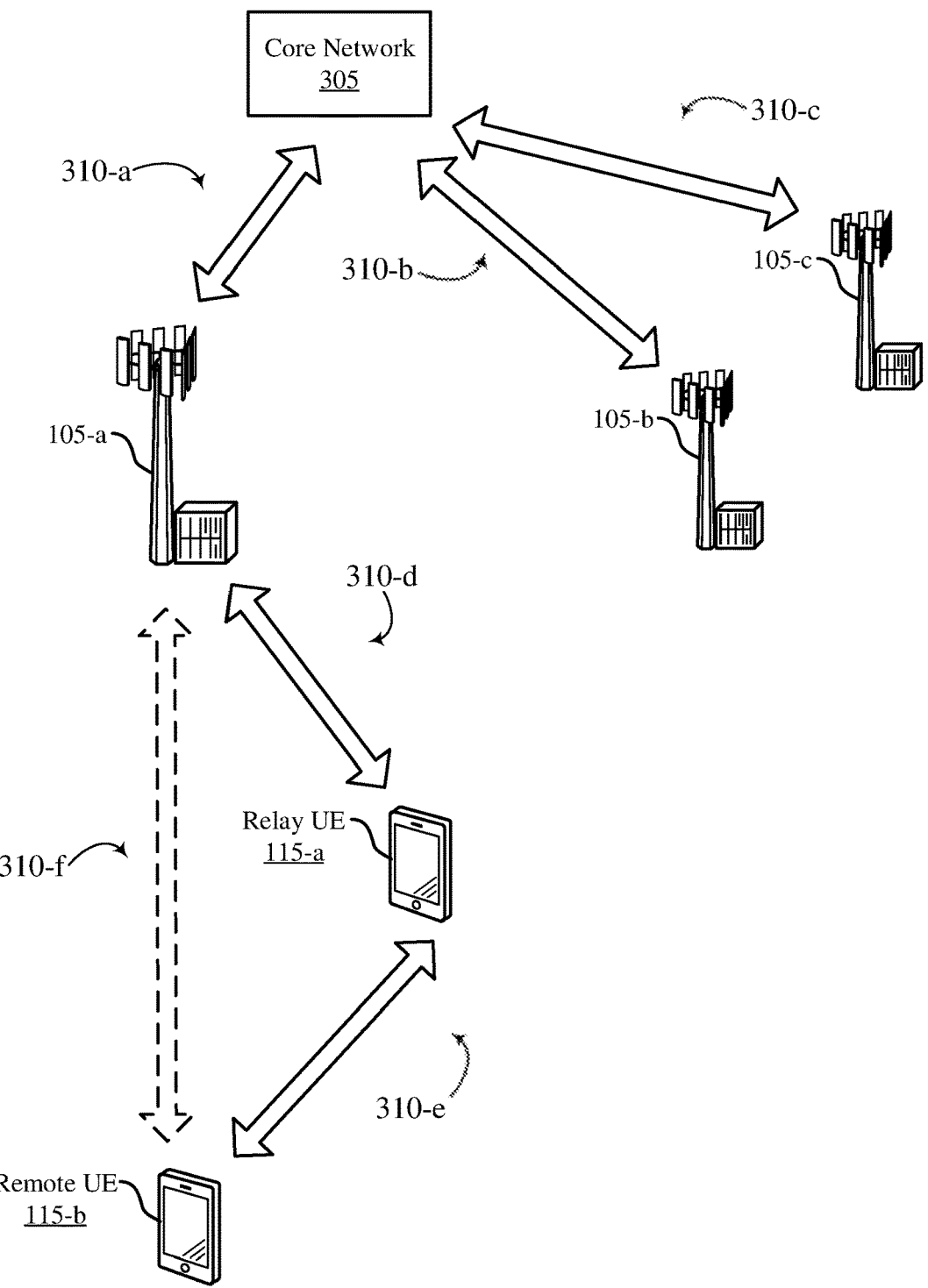
FIG. 3 illustrates an example of a wireless communications system that supports techniques for sidelink relay handover procedure in accordance with aspects of the present disclosure.

FIG. 3 illustrates an example of a wireless communications system 300 that supports techniques for sidelink relay handover procedure in accordance with aspects of the present disclosure. In some aspects, aspects of the wireless communications system 300 may implement, or be implemented by, aspects of the wireless communications system 100, relay configuration 200, or both.

The wireless communications system 300 may include a first base station 105-*a*, a second base station 105-*b*, a third base station 105-*c*, a relay UE 115-*a*, and a remote UE 115-*b* and 115-*c*, and a core network 305, which may be examples of UEs 115, base stations 105, and other wireless devices as described with reference to FIGS. 1 and 2.

In some aspects, the first base station 105-*a*, the second base station 105-*b*, and the third base station 105-*c* may communicate with the core network 305 using a communication links 310-*a*, 310-*b*, and 310-*c*, respectively. The communication links 310-*a*, 310-*b*, and 310-*c* may be examples of an N3 interface between the base stations 105 and the core network 305 of the wireless communications system 300.

The relay UE 115-*a* may communicate with the first base station 105-*a* (e.g., source base station 105-*a*) using a communication link 310-*d*. The communication link 310-*d* may include an example of an NR or LTE link between the relay UE 115-*a* and the first base station 105-*a*. In some cases, the communication link 310-*d* may include an example of an access link (e.g., Uu link) which may include a bi-directional link that enables both uplink and downlink communication. For example, the relay UE 115-*a* may transmit uplink signals, such as uplink control signals or uplink data signals, to the first base station 105-*a* using the communication link 310-*d*, and the first base station 105-*a* may transmit downlink signals, such as downlink control signals or downlink data signals, to the relay UE 115-*a* using the communication link 310-*d*.

In some aspects, the relay UE 115-*a* may be communicatively coupled to a remote UE 115-*b* via communication link 310-*e*. The communication link 310-*e* may include an example of a sidelink communication link or PC5 link between the relay UE 115-*a* and the remote UE 115-*b*. In some aspects, the relay UE 115-*a* may be configured to forward, or relay, wireless communications between the first base station 105-*a* and the remote UE 115-*b*. For example, the remote UE 115-*b* may be configured to transmit data to the relay UE 115-*a* via communication link 310-*e*, and the relay UE 115-*a* may be configured to forward (e.g., relay) the data received from the remote UE 115-*b* to the first base station 105-*a* via the communication link 310-*d*. Conversely, the first base station 105-*a* may be configured to transmit data (e.g., downlink signals) to the relay UE 115-*a* via communication link 310-*d*, and the relay UE 115-*a* may be configured to forward (e.g., relay) the data received from the first base station 105-*a* to the remote UE 115-*b* via the via the communication link 310-*e*. As noted previously herein, the use of sidelink relays (e.g., the use of the relay UE 115-*a*) may enable the remote UE 115-*b* to reduce a transmission power of uplink transmissions, thereby reducing a power consumption at the remote UE 115-*b*.

As noted previously herein, the use of sidelink relays may result in complexities in the context of performing cell handover procedures from one base station 105 to another. The complexities of performing cell handover procedures with sidelink relays may be further caused by the fact that not all base stations 105 in a wireless communications system may support sidelink relay operation. For example, the first base station 105-*a* and the second base station 105-*b* may support sidelink relay operation (e.g., SL-RelayCapableBSs), while the third base station 105-*c* may not support sidelink relay operation (e.g., non-SL-RelayCapableBSs). For the purposes of the present disclosure, a base station 105 may be considered to support sidelink relay operation if the base station 105 supports sidelink relay discovery procedures and sidelink relay communications (e.g., sidelink relay operation) within a single carrier. Conversely, for the purposes of the present disclosure, a base station 105 which does not support sidelink relay configuration may not support sidelink relay discovery procedures and sidelink relay communications within a single carrier. Identifying base stations which do not support sidelink relay operation (e.g., non-SL-RelayCapableBS) may be particularly important in the case where a UE 115 supports sidelink relays, but candidate base stations 105 do not.

In some wireless communications systems, relay UEs 115 (e.g., relay UE 115-*a*) may only connect to base stations 105 which support sidelink relay operation (e.g., SL-RelayCapableBSs), thereby limiting a quantity of base stations 105 with which relay UEs 115 may perform handover procedures. For example, in the context of L2 sidelink relay, the relay UE 115-*a* may only be able to connect to base stations 105 which support sidelink relay operation, including the transmission of discovery messages. Comparatively, in the context of L3 sidelink relay, the relay UE 115-*a* may be configured to communicate with base stations 105 which do not support sidelink relay operation. In such cases, the relay UE 115-*a* may be configured to transmit discovery messages in accordance with signaled or configured (e.g., pre-configured) sidelink relay configurations when it is connected to a non-SL-RelayCapableBS whose serving carrier is not shared with a sidelink carrier.

Furthermore, remote UEs 115 (e.g., remote UE 115-*b*) may prefer to perform handover procedures to base stations 105 which support sidelink relay operation (e.g., SL-Relay-CapableBSs). However, some wireless communications systems do not provide signaling or techniques which enable relay UEs 115 and/or remote UEs 115 to identify which base stations 105 support sidelink relay operation, and which do not. Moreover, in cases where a remote UE 115 (e.g., remote UE 115-*b*) which supports L2 and/or L3 relay is directly coupled (e.g., via a Uu link) to a base station 105 which does not support sidelink relay (e.g., non-SL-RelayCapableBSs), the remote UE 115 may be configured to transmit discovery messages in accordance with signaled or configured (e.g., pre-configured) sidelink relay configurations when it is connected to a non-SL-RelayCapableBS whose serving carrier is not shared with a sidelink carrier.

Accordingly, the UEs 115 and the base stations 105 of the wireless communications system 300 may support signaling and other techniques which may enable the relay UE 115-*a* and/or the remote UE 115-*b* to identify whether base stations 105 support sidelink relay operations (e.g., whether a base station 105 includes a SL-RelayCapableBS or a non-SL-RelayCapableBS), which may help inform decisions for handover procedures. In particular, the relay UE 115-*a* and the remote UE 115-*b* may perform a handover procedure from a source base station 105 (e.g., first base station 105-*a*) to a target base station 105 (e.g., second base station 105-*b*) based on determining that the target base station 105 supports sidelink relay operation.

In some aspects, the relay UE 115-*a* and/or the remote UE 115-*b* may determine whether a base station 105 of the wireless communications system 300 supports sidelink relay operation based on SIB messages received from the respective bases stations 105. In some cases, the SIB may indicate whether a base station 105 supports sidelink relay operation explicitly (e.g., based on explicit bit fields within the SIB) and/or implicitly (e.g., based on identifying an absence of a sidelink relay configuration). Additionally, or alternatively, the relay UE 115-*a* and/or the remote UE 115-*b* may determine whether base stations 105 support sidelink relay operation based on PCF signaling received from the core network 305.

In some cases, both the relay UE 115-*a* and the remote UE 115-*b* may control or influence which candidate base stations 105 it will perform a handover procedure with based on measurement reports. For example, when transmitting measurement reports for candidate base stations, the UEs 115-*a* and/or 115-*b* may omit measurements for base stations 105 which do not support sidelink relay operation, may indicate which base stations 105 do not support sidelink relay operation, may indicate a preference for base stations 105 which support sidelink relay operation, or any combination thereof. For instance, in cases where the second base station 105-*b* supports sidelink relay operation (e.g., SL-RelayCapableBS) but the third base station 105-*c* does not support sidelink relay operation (e.g., non-SL-RelayCapableBS), the UEs 115-*a* and/or 115-*b* may be configured to transmit measurements reports to the first base station 105-*a*, where the measurement reports omit measurements for the third base station 105-*c*, indicate that the third base station 105-*c* does not support sidelink relay operation, indicate a preference for the second base station 105-*b*, or any combination thereof. In some aspects, UEs 115 may be configured to tailor measurement reporting (e.g., omit measurements for non-SL-RelayCapableBSs, flag non-SL-RelayCapableBSs) based on RRC signaling.

As noted previously herein, the relay UE 115-*a* may be required to be communicatively coupled to a base station 105 which supports sidelink relay operation (e.g., SL-RelayCapableBSs) for L2 relays, but may be communicatively coupled to a base station 105 which does not support sidelink relay operation (e.g., non-SL-RelayCapableBSs) for L3 relays. Moreover, the remote UE 115-*a* may be communicatively coupled to both SL-RelayCapableBSs and non-SL-RelayCapableBSs for both L2 and L3 relays. However, there may be a preference for both the relay UE 115-*a* and the remote UE 115-*b* to be communicatively coupled to base stations 105 which support sidelink relay in order to promote more widespread use of sidelink relays.

Accordingly, techniques described herein may enable UEs 115 (e.g., relay UE 115-*a*, remote UE 115-*b*) to determine that they are communicatively coupled to a base station 105 which does not support sidelink relay operation, and perform a handover procedure to a base station 105 which does support sidelink relay operation. In some cases, the handover procedures and the determination as to whether candidate base stations 105 support sidelink relay may be assisted by the network via measurement reporting, as will be described in further detail herein with respect to FIGS. 4 and 5.

In additional or alternative aspects, the relay UE 115-*a* and/or the remote UE 115-*b* may trigger (e.g., initiate) discovery procedures to connect with a SL-RelayCapableBS in cases where the respective UEs 115 are connected with a non-SL-RelayCapableBS. For example, in some cases, the first base station 105-*a* may not support sidelink relay operation in a first frequency range. In this example, the remote UE 115-*b* may be communicatively coupled to the first base station 105-*a* via a communication link 310-*f*, and may communicate with the first base station 105-*a* within the first frequency range. In this example, in order to connect with a base station 105 which does support sidelink relay operation, the remote UE 115-*b* may be configured (e.g., via upper layers) to search for base stations 105 (e.g., first base station 105-*a*, second base station 105-*b*, third base station 105-*c*) which support sidelink relay operation on a second frequency range which is different from the first frequency range. In this regard, the remote UE 115-*b* may search inter-frequencies for a base station 105 which supports sidelink discovery procedures and a sidelink relay configuration within a given frequency range.

Continuing with the same example, in some cases, the remote UE 115-*b* may identify a frequency range in which a base station 105 supports both sidelink discovery procedures and sidelink relay configuration. In such cases, the remote UE 115-*b* may camp on the respective cell with the strongest signal (e.g., strongest reference signal received power (RSRP), strongest reference signal received quality (RSRQ)) of the identified frequency, and may trigger a sidelink discovery procedure in accordance with a sidelink relay configuration associated with the cell. Comparatively, in other cases, the remote UE 115-*b* may not identify a frequency range which supports both sidelink discovery procedures and sidelink relay configuration. In such cases, the remote UE 115-*b* may select a frequency range without cellular coverage, and may trigger a discovery procedure for a SL-RelayCapableBS in accordance with a pre-configured sidelink relay configuration. In this regard, the remote UE 115-*b* may be configured to trigger discovery procedures for L2 and L3 relays by searching inter-frequencies which support sidelink discovery procedures and sidelink relay configuration. Moreover, the relay UE 115-*a* may be configured to perform similar techniques in order to trigger discovery procedures for L3 relays.

Figure 4:
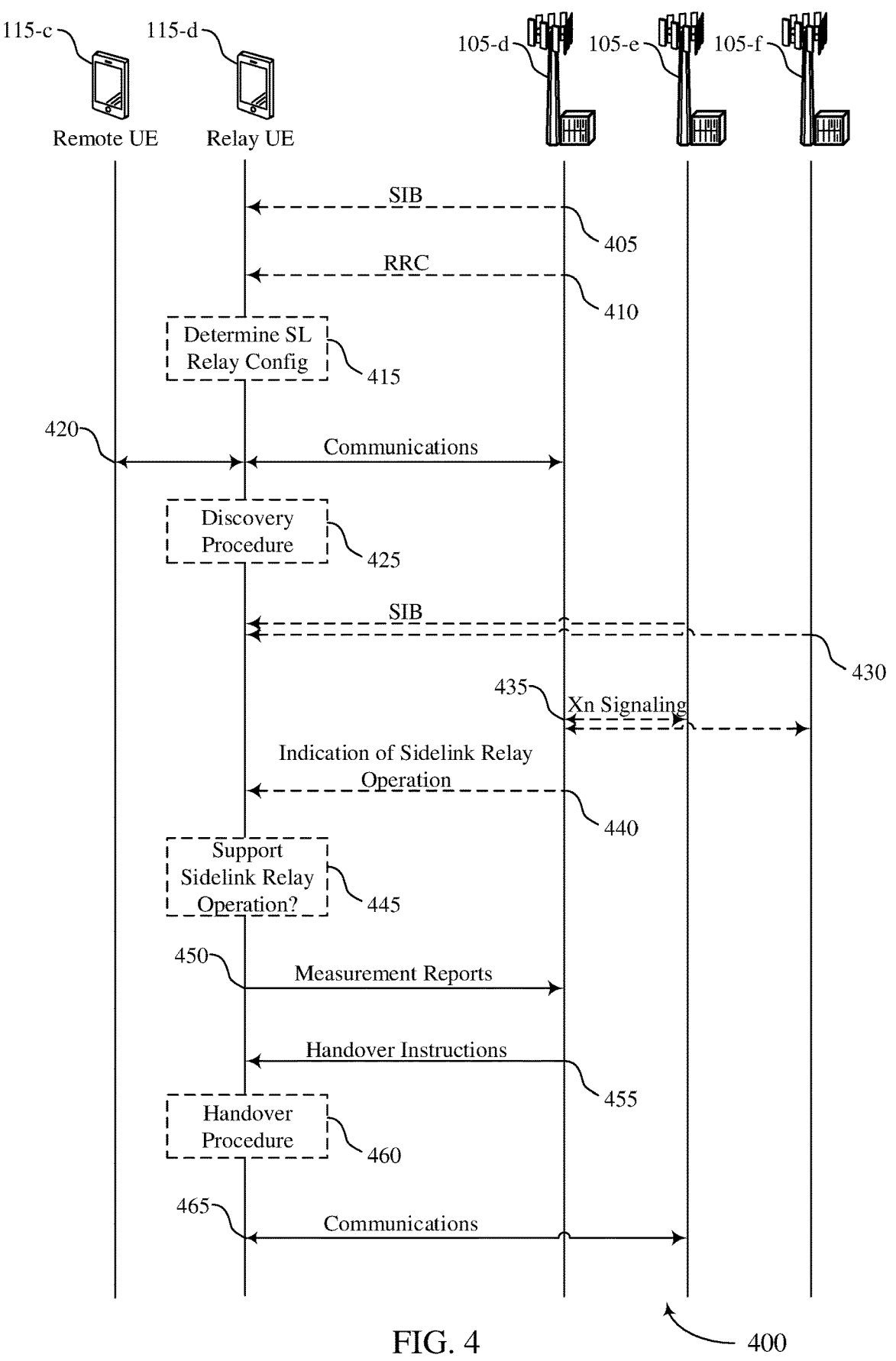
FIG. 4 illustrates an example of a process flow that supports techniques for sidelink relay handover procedure in accordance with aspects of the present disclosure.
Figure 5:
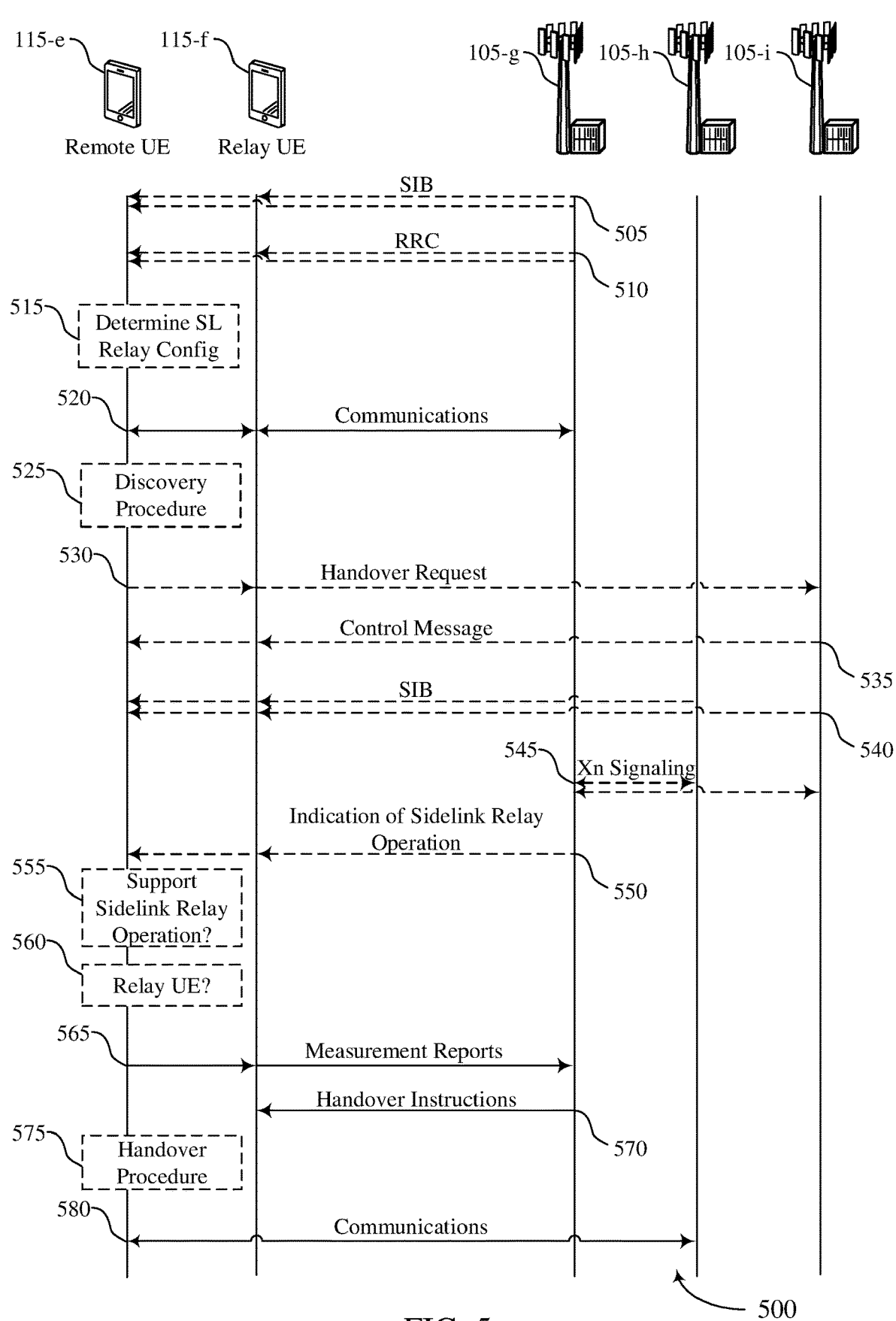
FIG. 5 illustrates an example of a process flow that supports techniques for sidelink relay handover procedure in accordance with aspects of the present disclosure.

Techniques which may be used by UEs 115 and base stations 105 to identify whether base stations 105 support sidelink relay operation and to perform handover procedures based on the capability of base stations 105 to support sidelink relay operations are discussed in further detail herein with respect to FIGS. 4 and 5.

FIG. 4 illustrates an example of a process flow 400 that supports techniques for sidelink relay handover procedure in accordance with aspects of the present disclosure. In some examples, process flow 400 may implement, or be implemented by, aspects of wireless communications systems 100, relay configuration 200, wireless communications system 300, or any combination thereof. For example, the process flow 400 may illustrate a relay UE 115-d determining whether candidate base stations 105 support sidelink relay operation, and performing a handover procedure with a candidate base station 105 based on the determination, as described with reference to FIGS. 1-3.

In some cases, process flow 400 may include a remote UE 115-c, a relay UE 115-d, a first base station 105-d, a second base station 105-e, and a third base station 105-f, which may be examples of corresponding devices as described herein. For example, in some cases, the remote UE 115-c and the relay UE 115-d illustrated in FIG. 4 may be examples of the remote UE 115-b and the relay UE 115-a, respectively, as illustrated in FIG. 3. Similarly, the first base station 105-d, the second base station 105-e, and the third base station 105-f illustrated in FIG. 4 may be examples of the first base station 105-a, the second base station 105-b, and the third base station 105-c, respectively, as illustrated in FIG. 3.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the relay UE 115-d may receive a SIB message from the first base station 105-d. In some aspects, the SIB message may indicate whether or not the first base station 105-b supports sidelink relay operation or not (e.g., determine whether the first base station 105-d is SL-RelayCapableBS or non-SL-RelayCapableBS). For example, in some cases, the SIB message may include one or more bit fields which explicitly indicate whether the first base station 105-d supports sidelink relay operation. In this regard, the SIB message may include one or more bit fields which indicate whether the first base station 105-d supports sidelink discovery procedures and sidelink relay within a single carrier.

In additional or alternative aspects, the SIB message may implicitly indicate whether the first base station 105-d supports sidelink relay operation. For example, if the relay UE 115-d determines that the SIB message provides a sidelink relay configuration for sidelink relay operation, the UE 115-d may determine that the first base station 105-d supports sidelink relay operation. Conversely, if the relay UE 115-d decodes (e.g., demodulates) the SIB message and does not identify a sidelink relay configuration, the relay UE 115-d may determine that the first base station 105-d does not support sidelink relay operation.

As noted previously herein, for L2 relay, the relay UE 115-d may only be communicatively coupled to base stations 105 which support sidelink relay operation (e.g., only connect to SL-RelayCapableBSs). In this regard, in the context of L2 relay, the SIB message transmitted by the first base station 105-d may indicate that the first base station 105-d supports sidelink relay operation. Moreover, in the context of handover procedures for L2 relay, both a source base station 105 and a target base station 105 for a handover procedure at the relay UE 115-d may include base stations 105 which support sidelink relay operation.

At 410, the relay UE 115-d may receive an RRC message from the first base station 105-d. The relay UE 115-d may receive the RRC message at 410 based on receiving the SIB message at 405. In some aspects, the RRC message may indicate a measurement reporting configuration for transmitting measurement reports to the first base station 105-d. In this regard, the RRC message may indicate whether the relay UE 115-d is to measure and/or report measurements for SL-RelayCapableBSs, non-SL-RelayCapableBSs, or both. Additionally, or alternatively, the RRC message may indicate whether measurement reports should indicate (e.g., flag) which base stations 105 support sidelink relay operation or not, whether the relay UE 115-d should indicate a preference for base stations 105 which support sidelink relay operation, or any combination thereof.

For example, in some cases, the RRC message may indicate that measurement reports transmitted by the relay UE 115-d which indicate measurements for candidate base stations 105 should omit measurements which are associated with base stations 105 which do not support sidelink relay operation. In other words, the RRC message may indicate that the relay UE 115-d should omit measurements for non-SL-RelayCapableBSs from measurement reports. Additionally, or alternatively, the RRC message may instruct the relay UE 115-d to refrain from performing measurements on signals associated with non-SL-RelayCapableBSs.

By way of another example, the RRC message may indicate that measurement reports transmitted by the relay UE 115-d should include indications as to whether base stations 105 associated with the reported measurements are associated with SL-RelayCapableBSs, non-SL-RelayCapableBSs, or both. In this regard, the RRC message may instruct the relay UE 115-d to flag measurements as being associated with base stations 105 which do or do not support sidelink relay operation.

At 415, the relay UE 115-d may determine a sidelink relay configuration associated with the first base station 105-d. In some aspects, the sidelink relay configuration may provide a set of rules or other configurations for performing discovery procedures at the relay UE 115-d, for relaying communications between the first base station 105-d and the remote UE 115-c, and the like. The relay UE 115-d may determine the sidelink relay configuration based on receiving the SIB message at 405, receiving the RRC message at 410, or both.

At 420, the relay UE 115-d may be configured to communicate with the first base station 105-d. Additionally, in some aspects, the relay UE 115-d may be configured to relay (e.g., forward) wireless communications between the first base station 105-d and the remote UE 115-c. For example, the relay UE 115-d may be configured to relay wireless communications between the first base station 105-d and the remote UE 115-c via at least a sidelink communication link between the remote UE 115-c and the relay UE 115-d, a Uu link between the relay UE 115-d and the first base station 105-d, or both. In this regard, the remote UE 115-c may communicate with the first base station 105-d (e.g., exchange uplink and/or downlink signals) via at least the sidelink communication link between the remote UE 115-c and the relay UE 115-d.

At 425, the relay UE 115-d may perform a discovery procedure. As noted previously herein, for L2 relay, the relay UE 115-d may be configured to connect only to base stations 105 which support sidelink relay operation. In this regard, the relay UE 115-d may be configured to perform the discovery procedure at 425 to identify another base station 105 which supports sidelink relay operation. In some aspects, the relay UE 115-d may perform the discovery procedure at 425 based on receiving the SIB message at 405, receiving the RRC message at 410, determining the sidelink relay configuration associated with the first base station 105-d at 415, or any combination thereof. For example, the relay UE 115-d may perform the discovery procedure based on (e.g., in accordance with) the determined sidelink relay configuration.

At 430, the relay UE 115-d may receive a SIB message from at least one candidate base station 105. For example, as shown in FIG. 4, the relay UE 115-d may receive SIB messages from the second base station 105-e, the third base station 105-d, or both.

As noted previously herein, the SIB messages received from the candidate base stations may explicitly or implicitly indicate whether or not the respective base stations (e.g., second base station 105-e, third base station 105-f) support sidelink relay operation. For example, in some cases, a SIB messages received from the second base station 105-e may include one or more bit field values which explicitly indicates whether the second base station 105-e supports sidelink relay operation or not. By way of another example, a SIB message received from the third base station 105-f may or may not include data indicative of a sidelink relay configuration associated with the third base station 105-f, which may serve as an implicit indication as to whether or not the third base station 105-f supports sidelink relay operation.

At 435, the first base station 105-d may perform an Xn interface procedure (e.g., exchange Xn signaling) with candidate base stations 105 in order to determine whether or not the respective candidate base stations 105 support sidelink relay operation. For example, the first base station 105-d may exchange Xn signaling with the second base station 105-e to determine whether or not the second base station 105-e supports sidelink relay operation.

At 440, the first base station 105-d may transmit a downlink transmission which indicates whether or not the respective candidate base stations 105 support sidelink relay operation. The first base station 105-d may transmit the indication at 440 based on performing the Xn procedures at 435. For example, by exchanging the Xn signaling at 435, the first base station 105-d may determine that the second base station 105-e does support sidelink relay operation, and the third base station 105-f does not support sidelink relay operation. In this example, the first base station 105-d may transmit, to the relay UE 115-d, an indication that the second base station 105-e does support sidelink relay operation, and the third base station 105-f does not support sidelink relay operation.

At 445, the relay UE 115-d may determine whether the candidate base stations 105 support sidelink relay operation or not (e.g., whether the candidate base stations 105 are SL-RelayCapableBSs or non-SL-RelayCapableBSs). For example, the relay UE 115-d may determine that the second base station 105-e supports sidelink relay operation, and the third base station 105-f does not support sidelink relay operation. In some aspects, the relay UE 115-d may determine whether the candidate base stations 105 support sidelink relay operation based on performing the discovery procedure at 425, receiving the SIB messages from the candidate base stations 105 at 430, receiving the explicit indications received from the first base station 105-d at 440, or both.

For example, in cases where the SIB messages received at 430 include one or more bit field values indicating whether or not the respective base stations 105-e and 105-f support sidelink relay operation, the relay UE 115-d may determine whether the respective base stations 105-e and 105-f support sidelink relay operation based on the one or more bit field values. By way of another example, upon receiving a SIB from the third base station 105-f, the relay UE 115-d may be configured to determine that the third base station 105-f does not support sidelink relay operation based on identifying an absence of data within the received SIB message which indicates that the third base station 105-f supports sidelink relay operation (e.g., implicit determination based on the SIB message).

At 450, the relay UE 115-d may transmit one or more measurement reports to the first base station 105-d. The measurement reports may indicate measurements (e.g., RSRP, RSRQ, SNR, SINR, channel quality indicator (CQI)) which were performed on signals received from one or more candidate base stations 105. In this regard, the measurement report may indicate measurements which the relay UE 115-d performed on signals (e.g., reference signals) received from the second base station 105-e, the third base station 105-f, or both. Additionally, or alternatively, the measurement reports may indicate whether or not the respective candidate base stations 105 support sidelink relay operation or not.

In some aspects, the relay UE 115-d may transmit the measurement reports at 450 based on receiving the SIB message at 405, receiving the RRC message at 410, determining the sidelink relay configuration associated with the first base station 105-d at 415, performing the discovery procedure at 425, receiving the SIB messages from the candidate base stations 105 at 430, receiving the indications at 440, determining whether the candidate base stations 105 support sidelink relay operation at 445, or any combination thereof.

For example, the relay UE 115-d may transmit the measurement reports at 450 in accordance with a measurement reporting configuration received via the RRC message at 410. For example, in some cases, the RRC message may indicate that measurement reports transmitted by the relay UE 115-d should omit measurements which are associated with base stations 105 which do not support sidelink relay operation. In this example, the relay UE 115-f may omit measurements for the third base station 105-f from the measurement reports based on determining that the third base station 105-f does not support sidelink relay operation.

By way of another example, the RRC message may indicate that measurement reports transmitted by the relay UE 115-d should include indications as to whether base stations 105 associated with the reported measurements are associated with SL-RelayCapableBSs, non-SL-RelayCapableBSs, or both. In this example, the measurement report may include measurements for both the second base station 105-e and the third base station 105-f, and may indicate that the second base station 105-e supports sidelink relay operation, the third base station 105-f does not support sidelink relay operation, or both.

At 455, the relay UE 115-d may receive, from the first base station 105-d, instructions to perform a handover procedure. The first base station 105-*d* may transmit the instructions for the handover procedure based on performing the Xn procedures at 435, receiving the measurement reports at 450, or both.

In some aspects, the instructions may instruct the relay UE 115-*d* to perform a handover procedure from the first base station 105-*d* to a candidate base station 105 which supports sidelink relay operation. For example, in cases where the measurement report indicates that the second base station 105-*e* supports sidelink relay operation, the instructions received at 455 may instruct the relay UE 115-*d* to perform a handover procedure from the first base station 105-*d* to the second base station 105-*e*.

At 460, the relay UE 115-*d* may perform the handover procedure from the first base station 105-*d* to the second base station 105-*f*. The relay UE 115-*d* may perform the handover procedure based on (e.g., in accordance with) the instructions received at 455. Additionally, or alternatively, the relay UE 115-*d* may perform the handover procedure based on receiving the SIB message from the first base station 105-*d* at 405, receiving the RRC message at 410, determining the sidelink relay configuration associated with the first base station 105-*d* at 415, performing the discovery procedure at 425, determining whether the candidate base stations 105 support sidelink relay operation at 445, transmitting the measurement reports at 450, receiving the instructions at 455, or any combination thereof.

At 465, the relay UE 115-*d* may communicate with the second base station 105-*e*. In some aspects, the relay UE 115-*d* may communicate with the second base station 105-*e* based on performing the handover procedure at 460. In this regard, the relay UE 115-*d* may exchange uplink and downlink transmissions with the second base station 105-*e* via a Uu link between the relay UE 115-*d* and the second base station 105-*f*.

In some aspects, the relay UE 115-*d* may be configured to relay communications between the second base station 105-*d* and the remote UE 115-*c*. For example, in cases where the wireless communications system supports group mobility for relay and remote UEs 115, the remote UE 115-*c* may perform the handover procedure along with the relay UE 115-*d*, in which case the relay UE 115-*d* may relay communications between the respective devices, as noted previously herein. By way of another example, in cases where the wireless communications system does not support group mobility, the remote UE 115-*c* may perform its own handover or reselection procedure to re-establish a wireless connection with the relay UE 115-*d* after the relay UE 115-*d* performs the handover procedure at 460. In this example, the relay UE 115-*d* may be configured to relay communications between the respective remote UE 115-*c* and the second base station 105-*d* once a wireless connection is re-established between the UEs 115-*c* and 115-*d*.

In some cases, as noted previously herein, the relay UE 115-*d* may be configured to search inter-frequencies and trigger (e.g., initiate) discovery procedures to connect with a SL-RelayCapableBS in cases where the relay UE 115-*d* is connected with a non-SL-RelayCapableBS. For example, in the context of L3 relay, the relay UE 115-*d* may be communicatively coupled to the third base station 105-*f* In this example, the relay UE 115-*d* may communicate with the third base station 105-*f* within a first frequency range, where the third base station 105-*f* does not support sidelink relay operation within the first frequency range. In order to connect with a base station 105 which does support sidelink relay operation, the relay UE 115-*d* may be configured (e.g., via upper layers) to search for base stations 105 (e.g., first base station 105-*d*, second base station 105-*e*, third base station 105-*f*) which support sidelink relay operation on a different frequency range from the first frequency range. In this regard, the remote UE 115-*b* may search inter-frequencies for a base station 105 which supports sidelink discovery procedures and a sidelink relay configuration within a given frequency range.

Continuing with the same example, in some cases, the relay UE 115-*d* may determine a fourth base station 105 (not shown) supports sidelink relay operation within a second frequency range which is different from the first frequency range. The relay UE 115-*d* may determine a sidelink relay configuration associated with the fourth base station 105, and may perform a discovery procedure associated with the fourth base station 105 based on (e.g., in accordance with) the sidelink relay configuration. may identify a frequency range in which a base station 105 supports both sidelink discovery procedures and sidelink relay configuration. In such cases, the relay UE 115-*d* may camp on the respective cell of the fourth base station 105 with the strongest signal (e.g., strongest RSRP, strongest RSRQ) of the second frequency range, and may trigger a sidelink discovery procedure in accordance with a sidelink relay configuration associated with the fourth base station 105.

Comparatively, in other cases, the relay UE 115-*d* may not identify a frequency range which supports both sidelink discovery procedures and sidelink relay configuration. In such cases, the relay UE 115-*d* may select a frequency range without cellular coverage, and may trigger a discovery procedure for a base station 105 which supports sidelink relay operation in accordance with a pre-configured sidelink relay configuration (e.g., in accordance with a sidelink relay configuration received via the RRC message at 410). In this regard, the relay UE 115-*d* may be configured to trigger discovery procedures for L3 relays by searching inter-frequencies which support sidelink discovery procedures and sidelink relay configuration.

Techniques described herein may enable improved handover procedures for both remote UEs 115 and relay UEs 115 in the context of wireless communications systems. In particular, techniques described herein may enable the relay UE 115-*d* to determine whether base stations 105 support sidelink relay operation or not, which may enable more informed decisions regarding handover procedures. By enabling the relay UE 115-*d* to determine whether base stations 105 support sidelink relay operation, techniques described herein may enable the relay UE 115-*d* to perform handover procedures with base stations 105 which support sidelink relay operation, thereby providing for more widespread use of sidelink relays and reducing power consumption at remote UEs 115 (e.g., remote UE 115-*c*).

FIG. 5 illustrates an example of a process flow 500 that supports techniques for sidelink relay handover procedure in accordance with aspects of the present disclosure. In some examples, process flow 500 may implement, or be implemented by, aspects of wireless communications systems 100, relay configuration 200, wireless communications system 300, process flow 400, or any combination thereof. For example, the process flow 400 may illustrate a remote UE 115-*e* determining whether candidate base stations 105 support sidelink relay operation, and performing a handover procedure with a candidate base station 105 based on the determination, as described with reference to FIGS. 1-3.

In some cases, process flow 500 may include a remote UE 115-*e*, a relay UE 115-*f*, a first base station 105-*g*, a second base station 105-*h*, and a third base station 105-*i*, which may be examples of corresponding devices as described herein.

For example, in some cases, the remote UE 115-*e* and the relay UE 115-*f* illustrated in FIG. 5 may be examples of the remote UE 115-*b* and the relay UE 115-*a*, respectively, as illustrated in FIG. 3. Similarly, the first base station 105-*g*, the second base station 105-*h*, and the third base station 105-*i* illustrated in FIG. 5 may be examples of the first base station 105-*a*, the second base station 105-*b*, and the third base station 105-*c*, respectively, as illustrated in FIG. 3.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the remote UE 115-*e* may receive a SIB message from the first base station 105-*g*. In some aspects, the SIB message may indicate whether or not the first base station 105-*b* supports sidelink relay operation or not (e.g., determine whether the first base station 105-*g* is SL-RelayCapableBS or non-SL-RelayCapableBS). For example, in some cases, the SIB message may include one or more bit fields which explicitly indicate whether the first base station 105-*g* supports sidelink relay operation. In this regard, the SIB message may include one or more bit fields which indicate whether the first base station 105-*g* supports sidelink discovery procedures and sidelink relay within a single carrier.

In additional or alternative aspects, the SIB message may implicitly indicate whether the first base station 105-*g* supports sidelink relay operation. For example, if the remote UE 115-*e* determines that the SIB message provides a sidelink relay configuration for sidelink relay operation, the remote UE 115-*e* may determine that the first base station 105-*g* supports sidelink relay operation. Conversely, if the remote UE 115-*e* decodes (e.g., demodulates) the SIB message and does not identify a sidelink relay configuration, the remote UE 115-*e* may determine that the first base station 105-*g* does not support sidelink relay operation.

In some aspects, the SIB message transmitted by the first base station 105-*g* may indicate that the first base station 105-*g* supports sidelink relay operation. Moreover, as shown in FIG. 5, the remote UE 115-*e* may be communicatively coupled to the first base station 105-*g* with or without the relay UE 115-*f*. In this regard, the remote UE 115-*e* may receive the SIB message directly from the first base station 105-*g* (e.g., via a Uu link between the first base station 105-*g* and the remote UE 115-*e*), via the relay UE 115-*f* (e.g., via at least a sidelink communication link between the remote UE 115-*e* and the relay UE 115-*f*), or both.

At 510, the remote UE 115-*e* may receive an RRC message from the first base station 105-*g*. The remote UE 115-*e* may receive the RRC message at 510 based on receiving the SIB message at 505. Moreover, the remote UE 115-*e* may receive the RRC message directly from the first base station 105-*g* (e.g., via a Uu link between the first base station 105-*g* and the remote UE 115-*e*), via the relay UE 115-*f* (e.g., via at least a sidelink communication link between the remote UE 115-*e* and the relay UE 115-*f*), or both.

In some aspects, the RRC message may indicate a measurement reporting configuration for transmitting measurement reports to the first base station 105-*g*. In this regard, the RRC message may indicate whether the remote UE 115-*e* is to measure and/or report measurements for SL-RelayCapableBSs, non-SL-RelayCapableBSs, or both. Additionally, or alternatively, the RRC message may indicate whether measurement reports should indicate (e.g., flag) which base stations 105 support sidelink relay operation or not, whether the remote UE 115-*e* should indicate a preference for base stations 105 which support sidelink relay operation, or any combination thereof.

For example, in some cases, the RRC message may indicate that measurement reports transmitted by the remote UE 115-*e* which indicate measurements for candidate base stations 105 should omit measurements which are associated with base stations 105 which do not support sidelink relay operation. In other words, the RRC message may indicate that the remote UE 115-*e* should omit measurements for non-SL-RelayCapableBSs from measurement reports. Additionally, or alternatively, the RRC message may instruct the remote UE 115-*e* to refrain from performing measurements on signals associated with non-SL-RelayCapableBSs.

By way of another example, the RRC message may indicate that measurement reports transmitted by the remote UE 115-*e* should include indications as to whether base stations 105 associated with the reported measurements are associated with SL-RelayCapableBSs, non-SL-RelayCapableBSs, or both. In this regard, the RRC message may instruct the remote UE 115-*e* to flag measurements as being associated with base stations 105 which do or do not support sidelink relay operation. Furthermore, by way of another example, the RRC message may indicate that measurement reports transmitted by the remote UE 115-*e* should include measurements for base stations 105 which are associated with a relay UE 115, which are not associated with a relay UE 115, or both. For instance, in cases where the remote UE 115-*e* prioritizes sidelink relays, the RRC message may instruct the remote UE 115-*e* to omit measurements associated with base stations 105 which are not associated with a relay UE 115 (e.g., omit measurements for base stations 105 which do not have a relay UE 115).

In additional or alternative aspects, the remote UE 115-*e* may receive measurement reporting configurations for transmitting measurement reports via a PCF message received from the first base station 105-*g*, a core network associated with the first base station 105-*g*, or both. For example, the remote UE 115-*e* may receive, from a core network, a PCF message which instructs the remote UE 115-*e* to omit measurements associated with base stations 105 which do not support sidelink relay operation. In this regard, the remote UE 115-*e* may receive a measurement reporting configuration via the RRC message at 510, via PCF messages received via the core network, or both.

At 515, the remote UE 115-*e* may determine a sidelink relay configuration associated with the first base station 105-*g*. In some aspects, the sidelink relay configuration may provide a set of rules or other configurations for performing discovery procedures at the remote UE 115-*e*, for communications which are relayed between the first base station 105-*g* and the remote UE 115-*e* via the relay UE 115-*f*, and the like. The remote UE 115-*e* may determine the sidelink relay configuration based on receiving the SIB message at 505, receiving the RRC message at 510, receiving a PCF message, or any combination thereof.

At 520, the remote UE 115-*e* may be configured to communicate with the first base station 105-*g*. In some aspects, the remote UE 115-*e* may be configured to communicate with the first base station 105-*g* via at the relay UE 115-*f* which is configured to relay (e.g., forward) wireless communications between the first base station 105-*g* and the remote UE 115-*e*. For example, the relay UE 115-*f* may be configured to relay wireless communications between the first base station 105-*g* and the remote UE 115-*e* via at least a sidelink communication link between the remote UE 115-*e* and the relay UE 115-*f*, a Uu link between the relay UE 115-*f* and the first base station 105-*g*, or both. In this regard, the remote UE 115-*e* may communicate with the first base station 105-*g* (e.g., exchange uplink and/or downlink signals) via at least the sidelink communication link between the remote UE 115-*e* and the relay UE 115-*f*.

At 525, the remote UE 115-*e* may perform a discovery procedure. The relay UE 115-*e* may be configured to perform the discovery procedure at 525 to identify another base station 105 which supports sidelink relay operation. In some aspects, the remote UE 115-*e* may perform the discovery procedure at 525 based on receiving the SIB message at 505, receiving the RRC message at 510, determining the sidelink relay configuration associated with the first base station 105-*g* at 515, or any combination thereof. For example, the remote UE 115-*e* may perform the discovery procedure based on (e.g., in accordance with) the determined sidelink relay configuration.

At 530, the remote UE 115-*e* may transmit a handover request to a base station 105 which does not support sidelink relay operation. For example, as shown in FIG. 5, the remote UE 115-*e* may transmit a handover request to the third base station 105-*i*, where the third base station 105-*i* does not support sidelink relay operation. The remote UE 115-*e* may transmit the handover request directly to the third base station 105-*i*, via the relay UE 115-*f*, or both. The handover request may include a request for the remote UE 115-*e* to perform a handover procedure from the first base station 105-*g* and/or relay UE 115-*f* to the third base station 105-*e*.

At 535, the third base station 105-*i* may transmit a control message to the remote UE 115-*i*. In some aspects, the control message may reject the handover request which was received at 530. In particular, the third base station 105-*i* may reject the handover request based on the third base station 105-*i* not supporting sidelink relay operation. In this regard, the third base station 105-*i* may be configured to determine that the remote UE 115-*e* is a remote UE 115 and/or that the remote UE 115-*e* may prefer to handover to base stations 105 which support sidelink relay operation (with or without a relay UE 115), and may reject the handover request based on the third base station 105-*i* not supporting sidelink relay operation.

At 540, the remote UE 115-*e* may receive a SIB message from at least one candidate base station 105. For example, as shown in FIG. 5, the remote UE 115-*e* may receive SIB messages from the second base station 105-*h*, the third base station 105-*i*, or both. Moreover, the remote UE 115-*e* may be configured to receive the SIB messages via Uu links with the respective base stations 105-*h* and 105-*i*, via the relay UE 115-*f* (e.g., via at least a sidelink communication link between the remote UE 115-*e* and the relay UE 115-*f*), or both.

As noted previously herein, the SIB messages received from the candidate base stations may explicitly or implicitly indicate whether or not the respective base stations (e.g., second base station 105-*h*, third base station 105-*i*) support sidelink relay operation. For example, in some cases, a SIB messages received from the second base station 105-*h* may include one or more bit field values which explicitly indicates whether the second base station 105-*h* supports sidelink relay operation or not. By way of another example, a SIB message received from the third base station 105-*i* may or may not include data indicative of a sidelink relay configuration associated with the third base station 105-*i*, which may serve as an implicit indication as to whether or not the third base station 105-*i* supports sidelink relay operation.

At 545, the first base station 105-*g* may perform an Xn interface procedure (e.g., exchange Xn signaling) with candidate base stations 105 in order to determine whether or not the respective candidate base stations 105 support sidelink relay operation. For example, the first base station 105-*g* may exchange Xn signaling with the second base station 105-*h* to determine whether or not the second base station 105-*h* supports sidelink relay operation.

At 550, the first base station 105-*g* may transmit a downlink transmission which indicates whether or not the respective candidate base stations 105 support sidelink relay operation. The first base station 105-*g* may transmit the indication at 550 based on performing the Xn procedures at 545. For example, by exchanging the Xn signaling at 545, the first base station 105-*g* may determine that the second base station 105-*h* does support sidelink relay operation, and the third base station 105-*i* does not support sidelink relay operation. In this example, the first base station 105-*g* may transmit, to the remote UE 115-*e*, an indication that the second base station 105-*h* does support sidelink relay operation, and the third base station 105-*i* does not support sidelink relay operation. The remote UE 115-*e* may receive the indication at 550 via a Uu link with the first base stations 105-*g*, via the relay UE 115-*f* (e.g., via at least a sidelink communication link between the remote UE 115-*e* and the relay UE 115-*f*), or both.

At 555, the remote UE 115-*e* may determine whether the candidate base stations 105 support sidelink relay operation or not (e.g., whether the candidate base stations 105 are SL-RelayCapableBSs or non-SL-RelayCapableBSs). For example, the remote UE 115-*e* may determine that the second base station 105-*h* supports sidelink relay operation, and the third base station 105-*i* does not support sidelink relay operation. In some aspects, the remote UE 115-*e* may determine whether the candidate base stations 105 support sidelink relay operation based on performing the discovery procedure at 525, receiving the SIB messages from the candidate base stations 105 at 540, receiving the explicit indications received from the first base station 105-*g* at 550, or both.

For example, in cases where the SIB messages received at 540 include one or more bit field values indicating whether or not the respective base stations 105-*h* and 105-*i* support sidelink relay operation, the remote UE 115-*e* may determine whether the respective base stations 105-*h* and 105-*i* support sidelink relay operation based on the one or more bit field values. By way of another example, upon receiving a SIB from the third base station 105-*i*, the remote UE 115-*e* may be configured to determine that the third base station 105-*i* does not support sidelink relay operation based on identifying an absence of data within the received SIB message which indicates that the third base station 105-*i* supports sidelink relay operation (e.g., implicit determination based on the SIB message).

At 560, the remote UE 115-*e* may determine whether the respective candidate base stations 105 are associated with relay UEs 115 which are configured to relay wireless communications between the respective candidate base stations 105 and remote UEs 115. In this regard, the remote UE 115-*e* may determine whether the candidate base stations 105 are communicatively coupled to relay UEs 115 which could facilitate (e.g., relay, forward) wireless communications between the remote UE 115-*e* and the respective candidate base stations 105. In some aspects, the remote UE 115-*e* may determine whether candidate base stations 105 are associated with relay UEs 115 based on receiving the SIB message at 505, receiving the RRC message at 510, determining the sidelink relay configuration associated with the first base station 105-*g* at 515, receiving the SIB messages from the candidate base stations 105 at 540, receiving the indications at 550, determining whether the candidate base stations 105 support sidelink relay operation at 555, or any combination thereof.

At 565, the remote UE 115-*e* may transmit one or more measurement reports to the first base station 105-*g*. The measurement reports may be transmitted to the first base station 105-*g* via a Uu link with the first base stations 105-*g*, via the relay UE 115-*f* (e.g., via at least a sidelink communication link between the remote UE 115-*e* and the relay UE 115-*f*), or both. The measurement reports may indicate measurements (e.g., RSRP, RSRQ, SNR, SINR, CQI) which were performed on signals received from one or more candidate base stations 105. In this regard, the measurement report may indicate measurements which the remote UE 115-*e* performed on signals (e.g., reference signals) received from the second base station 105-*h*, the third base station 105-*i*, or both. In additional or alternative aspects, the measurement reports may indicate whether or not the respective candidate base stations 105 support sidelink relay operation or not, indications of priority for performing handover procedures with base stations 105 which support sidelink relay operation, or any combination thereof.

In some aspects, the remote UE 115-*e* may transmit the measurement reports at 565 based on receiving the SIB message at 505, receiving the RRC message at 510, receiving a PCF message from the core network, determining the sidelink relay configuration associated with the first base station 105-*g* at 515, performing the discovery procedure at 525, receiving the SIB messages from the candidate base stations 105 at 540, receiving the indications at 550, determining whether the candidate base stations 105 support sidelink relay operation at 555, determining whether the candidate base stations 105 are associated with relay UEs 115 at 560, or any combination thereof.

For example, the remote UE 115-*e* may transmit the measurement reports at 565 in accordance with a measurement reporting configuration received via the RRC message at 510 and. For instance, in some cases, the RRC message and/or a PCF message may indicate that measurement reports transmitted by the remote UE 115-*e* should omit measurements which are associated with base stations 105 which do not support sidelink relay operation. In this example, the remote UE 115-*e* may omit measurements for the third base station 105-*i* from the measurement reports based on determining that the third base station 105-*i* does not support sidelink relay operation.

By way of another example, the RRC message may indicate that measurement reports transmitted by the remote UE 115-*e* should include indications as to whether base stations 105 associated with the reported measurements are associated with SL-RelayCapableBSs, non-SL-RelayCapableBSs, or both. In this example, the measurement report may include measurements for both the second base station 105-*h* and the third base station 105-*i*, and may indicate that the second base station 105-*h* supports sidelink relay operation, the third base station 105-*i* does not support sidelink relay operation, or both. Furthermore, by way of another example, the RRC message may indicate that the remote UE 115-*e* should omit measurements for candidate base stations 105 which do not include a relay UE 115. In this example, the remote UE 115-*e* may determine that the second base station 105-*h* includes a relay UE 115 but the third base station 105-*e* does not include a relay UE 115. Accordingly, in this example, the measurement report transmitted at 565 may omit measurements for the third base station 105-*i*.

At 570, the remote UE 115-*e* may receive, from the first base station 105-*g*, instructions to perform a handover procedure. The first base station 105-*g* may transmit the instructions for the handover procedure based on performing the Xn procedures at 545, receiving the measurement reports at 565, or both.

In some aspects, the instructions may instruct the remote UE 115-*e* to perform a handover procedure from the first base station 105-*g* and/or the relay UE 115-*f* to a candidate base station 105 which supports sidelink relay operation. For example, in cases where the measurement report indicates that the second base station 105-*h* supports sidelink relay operation, the instructions received at 570 may instruct the remote UE 115-*e* to perform a handover procedure from the first base station 105-*g* and/or the relay UE 115-*f* to the second base station 105-*h*.

At 575, the remote UE 115-*e* may perform the handover procedure from the first base station 105-*g* to the second base station 105-*h*. The UE 115-*d* may perform the handover procedure based on (e.g., in accordance with) the instructions received at 555. Additionally, or alternatively, the relay UE 115-*d* may perform the handover procedure based on receiving the SIB message from the first base station 105-*g* at 505, receiving the RRC message at 510, determining the sidelink relay configuration associated with the first base station 105-*g* at 515, performing the discovery procedure at 525, receiving the control message at 535, determining whether the candidate base stations 105 support sidelink relay operation at 555, determining whether the candidate base stations 105 are associated with relay UEs 115 at 560, transmitting the measurement reports at 565, receiving the instructions at 570, or any combination thereof.

At 580, the remote UE 115-*e* may communicate with the second base station 105-*h*. In some aspects, the remote UE 115-*d* may communicate with the second base station 105-*h* based on performing the handover procedure at 575. In this regard, the remote UE 115-*e* may exchange uplink and downlink transmissions with the second base station 105-*h* via a Uu link between the remote UE 115-*e* and the second base station 105-*h*. Additionally, or alternatively, the remote UE 115-*e* may communicate with the second base station 105-*h* via a relay UE 115 which is configured to relay (e.g., forward) wireless communications between the remote UE 115-*e* and the second base station 105-*h*.

In additional or alternative aspects, the remote UE 115-*e* may be configured to initiate a handover procedure in order to establish wireless communications with a different relay UE 115 (which may be communicatively coupled to the first base station 105-*g* or a different base station 105). In this regard, the remote UE 115-*e* may be configured to trigger a relay reselection and/or relay handover procedure to establish wireless communications with a different relay UE 115.

Moreover, as noted previously herein, the remote UE 115-*e* may be configured to search inter-frequencies and trigger (e.g., initiate) discovery procedures to connect with a SL-RelayCapableBS in cases where the remote UE 115-*e* is connected with a non-SL-RelayCapableBS. For example, in the context of L2 or L3 relay, the remote UE 115-*e* may be communicatively coupled to the third base station 105-*i*. In this example, the remote UE 115-*e* may communicate with the third base station 105-*i* within a first frequency range, where the third base station 105-*i* does not support sidelink relay operation within the first frequency range. In order to connect with a base station 105 which does support sidelink relay operation, the remote UE 115-*e* may be configured (e.g., via upper layers) to search for base stations 105 (e.g., first base station 105-*g*, second base station 105-*h*, third base station 105-*i*) which support sidelink relay operation on a different frequency range from the first frequency range. In this regard, the remote UE 115-*e* may search inter-frequencies for a base station 105 which supports sidelink discovery procedures and a sidelink relay configuration within a given frequency range.

Continuing with the same example, in some cases, the remote UE 115-*e* may determine a fourth base station 105 (not shown) supports sidelink relay operation within a second frequency range which is different from the first frequency range. The remote UE 115-*e* may determine a sidelink relay configuration associated with the fourth base station 105, and may perform a discovery procedure associated with the fourth base station 105 based on (e.g., in accordance with) the sidelink relay configuration. may identify a frequency range in which a base station 105 supports both sidelink discovery procedures and sidelink relay configuration. In such cases, the remote UE 115-*e* may camp on the respective cell of the fourth base station 105 with the strongest signal (e.g., strongest RSRP, strongest RSRQ) of the second frequency range, and may trigger a sidelink discovery procedure in accordance with a sidelink relay configuration associated with the fourth base station 105.

Comparatively, in other cases, the remote UE 115-*e* may not identify a frequency range which supports both sidelink discovery procedures and sidelink relay configuration. In such cases, the remote UE 115-*e* may select a frequency range without cellular coverage, and may trigger a discovery procedure for a base station 105 which supports sidelink relay operation in accordance with a pre-configured sidelink relay configuration (e.g., in accordance with a sidelink relay configuration received via the RRC message at 510). In this regard, the remote UE 115-*e* may be configured to trigger discovery procedures for L2 and/or L3 relays by searching inter-frequencies which support sidelink discovery procedures and sidelink relay configuration.

Techniques described herein may enable improved handover procedures for both remote UEs 115 and relay UEs 115 in the context of wireless communications systems. In particular, techniques described herein may enable the remote UE 115-*e* to determine whether base stations 105 support sidelink relay operation or not, which may enable more informed decisions regarding handover procedures. By enabling the remote UE 115-*e* to determine whether base stations 105 support sidelink relay operation, techniques described herein may enable the remote UE 115-*e* to perform handover procedures with base stations 105 which support sidelink relay operation, thereby providing for more widespread use of sidelink relays and reducing power consumption at remote UEs 115 (e.g., remote UE 115-*e*).

Figure 6:
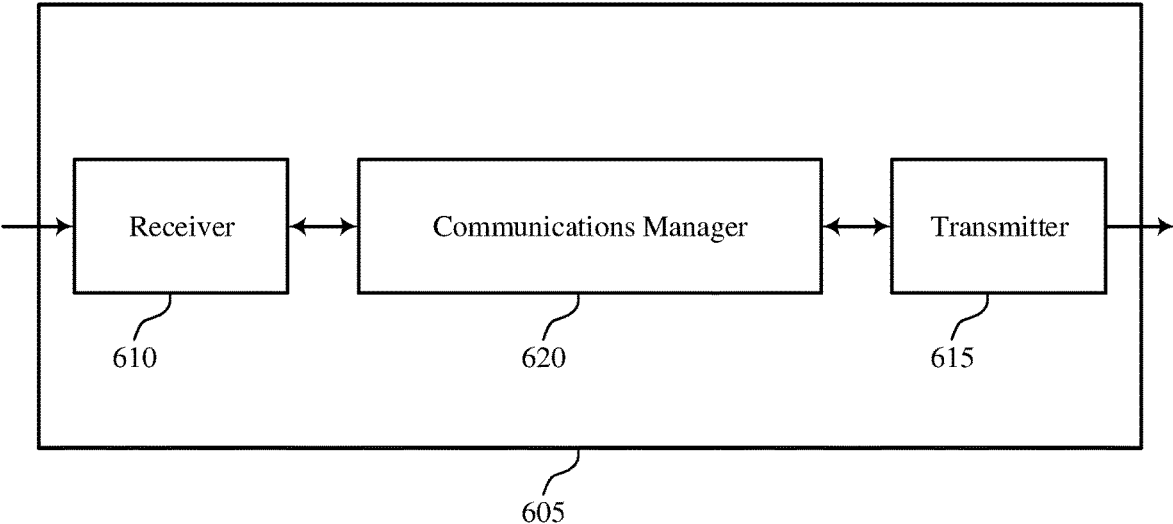
FIGS. 6 and 7 show block diagrams of devices that support techniques for sidelink relay handover procedure in accordance with aspects of the present disclosure.

FIG. 6 shows a block diagram 600 of a device 605 that supports techniques for sidelink relay handover procedure in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink relay handover procedure). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink relay handover procedure). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for sidelink relay handover procedure as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for relaying wireless communications between a first base station and a second UE via at least a sidelink communication link with the second UE. The communications manager 620 may be configured as or otherwise support a means for transmitting, to the first base station, a measurement report for one or more candidate base stations, the measurement report indicating that the one or more candidate base stations support sidelink relay operation. The communications manager 620 may be configured as or otherwise support a means for receiving instructions to perform a handover procedure from the first base station to a second base station of the one or more candidate base stations based on the measurement report, where the second base station supports sidelink relay operation. The communications manager 620 may be configured as or otherwise support a means for performing the handover procedure including establishing a wireless connection with the second base station based on the instructions.

Additionally, or alternatively, the communications manager 620 may support wireless communication at a second UE in accordance with examples as disclosed herein. For example, the communications manager 620 may be configured as or otherwise support a means for communicating with a first base station via a first UE configured to relay wireless communications between the second UE and the first base station via at least a sidelink communication link with the first UE. The communications manager 620 may be configured as or otherwise support a means for receiving instructions to perform a handover procedure from the first base station to a second base station based on the second base station supporting sidelink relay operation. The communications manager 620 may be configured as or otherwise support a means for performing the handover procedure to establish wireless communications with the second base station based on the instructions.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved handover procedures for both remote UEs 115 and relay UEs 115 in the context of wireless communications systems. In particular, techniques described herein may enable UEs 115 (e.g., relay UEs 115, remote UEs 115) to determine whether base stations 105 support sidelink relay operation or not, which may enable more informed decisions regarding handover procedures. By enabling UEs 115 to determine whether base stations 105 support sidelink relay operation, techniques described herein may enable UEs 115 to perform handover procedures with base stations which support sidelink relay operation, thereby providing for more widespread use of sidelink relays and reducing power consumption at remote UEs 115.

Figure 7:
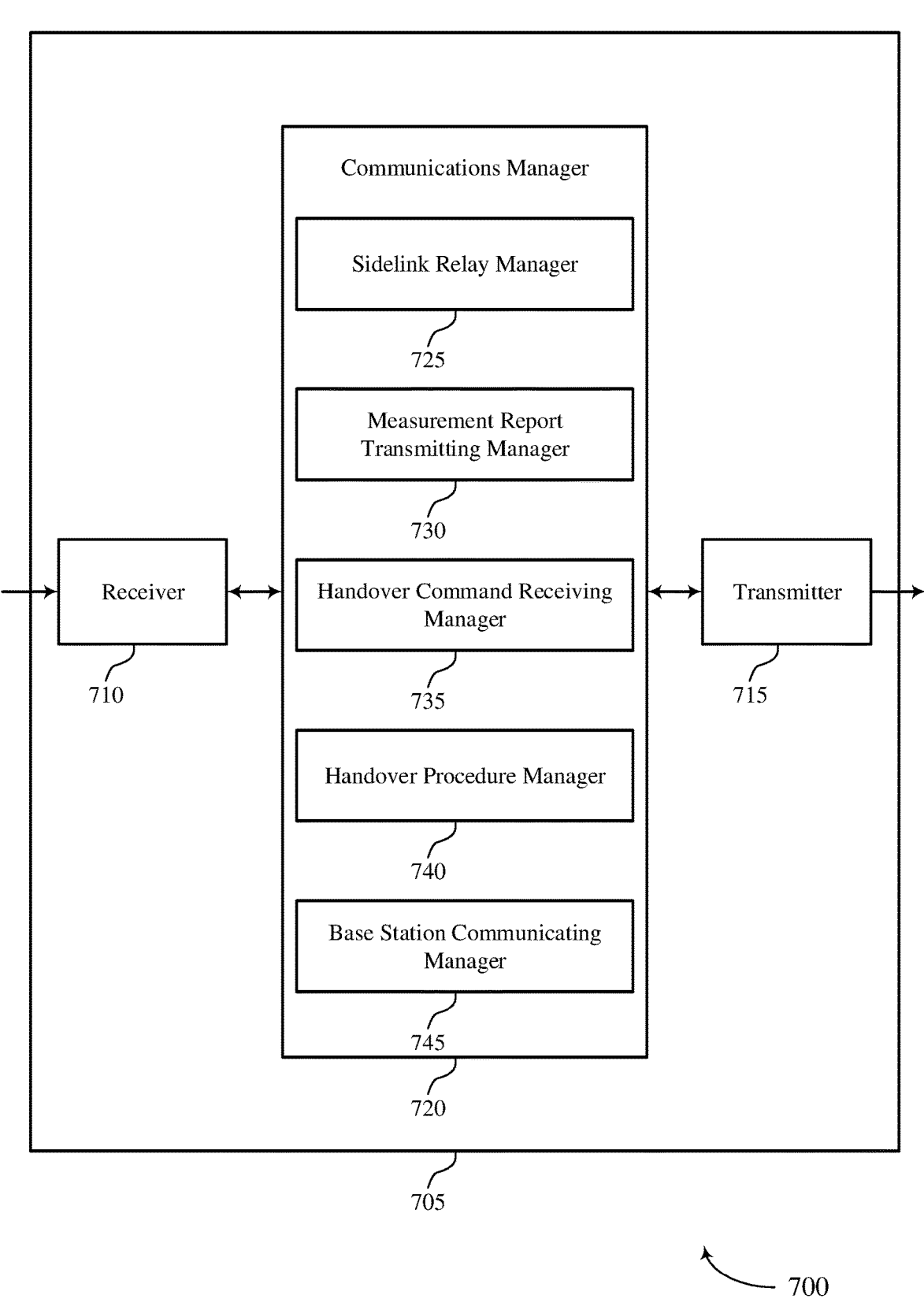

FIG. 7 shows a block diagram 700 of a device 705 that supports techniques for sidelink relay handover procedure in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for sidelink relay handover procedure). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for sidelink relay handover procedure). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for sidelink relay handover procedure as described herein. For example, the communications manager 720 may include a sidelink relay manager 725, a measurement report transmitting manager 730, a handover command receiving manager 735, a handover procedure manager 740, a base station communicating manager 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The sidelink relay manager 725 may be configured as or otherwise support a means for relaying wireless communications between a first base station and a second UE via at least a sidelink communication link with the second UE. The measurement report transmitting manager 730 may be configured as or otherwise support a means for transmitting, to the first base station, a measurement report for one or more candidate base stations, the measurement report indicating that the one or more candidate base stations support sidelink relay operation. The handover command receiving manager 735 may be configured as or otherwise support a means for receiving instructions to perform a handover procedure from the first base station to a second base station of the one or more candidate base stations based on the measurement report, where the second base station supports sidelink relay operation. The handover procedure manager 740 may be configured as or otherwise support a means for performing the handover procedure including establishing a wireless connection with the second base station based on the instructions.

Additionally, or alternatively, the communications manager 720 may support wireless communication at a second UE in accordance with examples as disclosed herein. The base station communicating manager 745 may be configured as or otherwise support a means for communicating with a first base station via a first UE configured to relay wireless communications between the second UE and the first base station via at least a sidelink communication link with the first UE. The handover command receiving manager 735 may be configured as or otherwise support a means for receiving instructions to perform a handover procedure from the first base station to a second base station based on the second base station supporting sidelink relay operation. The handover procedure manager 740 may be configured as or otherwise support a means for performing the handover procedure to establish wireless communications with the second base station based on the instructions.

Figure 8:
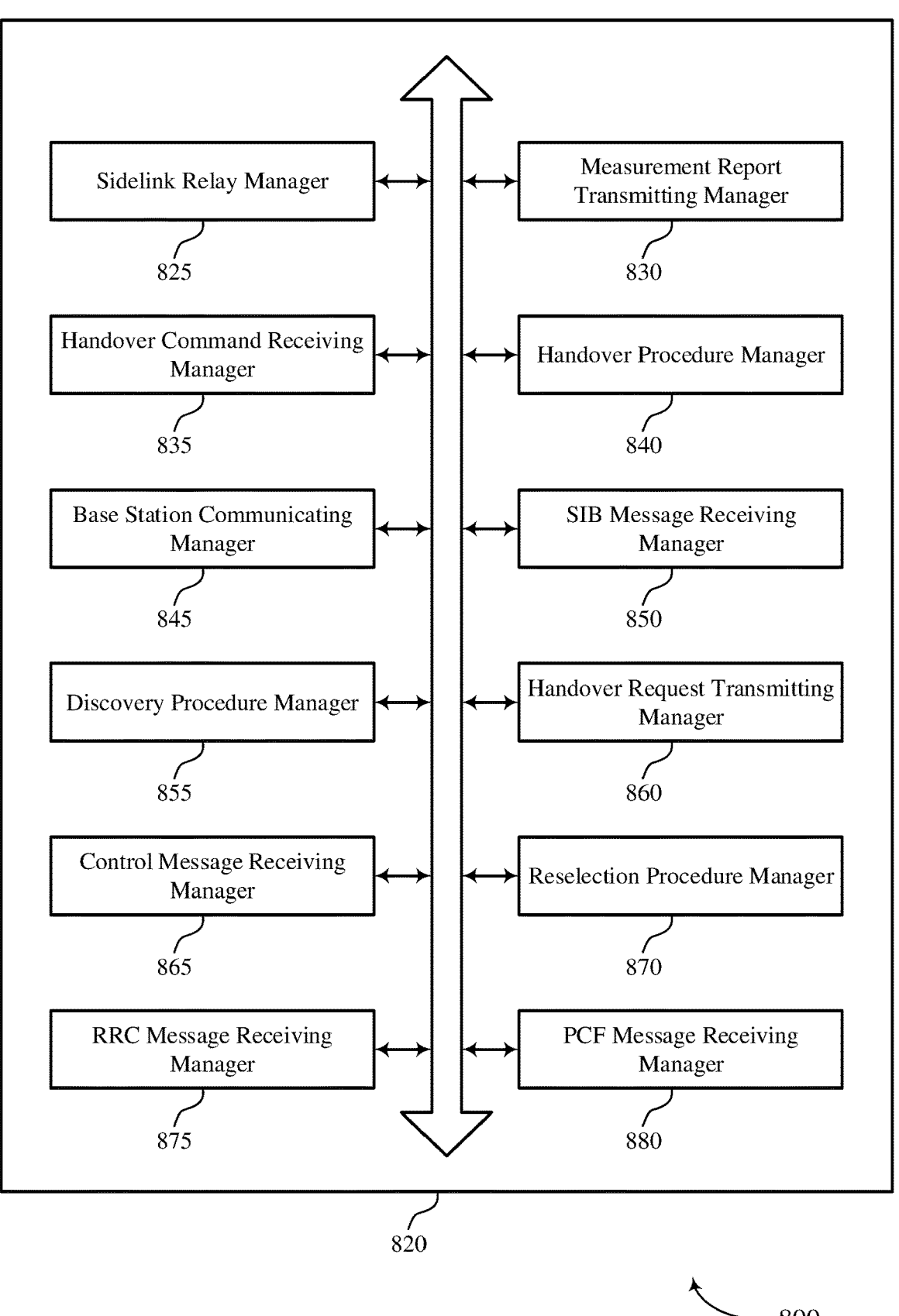
FIG. 8 shows a block diagram of a communications manager that supports techniques for sidelink relay handover procedure in accordance with aspects of the present disclosure.

FIG. 8 shows a block diagram 800 of a communications manager 820 that supports techniques for sidelink relay handover procedure in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for sidelink relay handover procedure as described herein. For example, the communications manager 820 may include a sidelink relay manager 825, a measurement report transmitting manager 830, a handover command receiving manager 835, a handover procedure manager 840, a base station communicating manager 845, an SIB message receiving manager 850, a discovery procedure manager 855, a handover request transmitting manager 860, a control message receiving manager 865, a reselection procedure manager 870, an RRC message receiving manager 875, a PCF message receiving manager 880, or any combination thereof. Each of these components may communicate, directly or indirectly, with one another (e.g., via one or more buses).

The communications manager 820 may support wireless communication at a first UE in accordance with examples as disclosed herein. The sidelink relay manager 825 may be configured as or otherwise support a means for relaying wireless communications between a first base station and a second UE via at least a sidelink communication link with the second UE. The measurement report transmitting manager 830 may be configured as or otherwise support a means for transmitting, to the first base station, a measurement report for one or more candidate base stations, the measurement report indicating that the one or more candidate base stations support sidelink relay operation. The handover command receiving manager 835 may be configured as or otherwise support a means for receiving instructions to perform a handover procedure from the first base station to a second base station of the one or more candidate base stations based on the measurement report, where the second base station supports sidelink relay operation. The handover procedure manager 840 may be configured as or otherwise support a means for performing the handover procedure including establishing a wireless connection with the second base station based on the instructions.

In some examples, the SIB message receiving manager 850 may be configured as or otherwise support a means for receiving a system information block message from at least one candidate base station of the one or more candidate base stations. In some examples, the sidelink relay manager 825 may be configured as or otherwise support a means for determining, based on the system information block message, that the at least one base station supports sidelink relay operation, where the first UE transmits the measurement report based on determining that the at least one candidate base station supports support sidelink relay operation.

In some examples, the SIB message receiving manager 850 may be configured as or otherwise support a means for receiving, via the system information block message, one or more bit field values indicating that the at least one candidate base station supports sidelink relay operation, where the determining is based on the one or more bit field values.

In some examples, the sidelink relay manager 825 may be configured as or otherwise support a means for determining that a third base station does not support sidelink relay operation, where transmitting the measurement report, performing the handover procedure, or both, is based on determining that the third base station does not support sidelink relay operation.

In some examples, the SIB message receiving manager 850 may be configured as or otherwise support a means for receiving, from the third base station, a system information block message, where determining that the third base station does not support sidelink relay operation is based on the system information block message.

In some examples, determining that the third base station does not support sidelink relay operation is based on identifying one or more bit fields within the system information block message indicating that the third base station does not support sidelink relay operation, identifying an absence of data within the system information block message which indicates that the third base station supports sidelink relay operation, or both.

In some examples, the measurement report omits measurements for the third base station based on the third base station not supporting sidelink relay operation. In some examples, performing the handover procedure with the second base station is based on the measurement report omitting measurements for the third base station.

In some examples, the RRC message receiving manager 875 may be configured as or otherwise support a means for receiving, from the first base station, a radio resource control message indicating for the first UE to omit measurements associated with base stations which do not support sidelink relay operation, where the first UE omits the measurements for the third base station based on the radio resource control message.

In some examples, to support transmitting the measurement report, the measurement report transmitting manager 830 may be configured as or otherwise support a means for transmitting measurements for the third base station via the measurement report, where the measurement report includes an indication that the third base station does not support sidelink relay operation, where performing the handover procedure with the second base station is based on the indication that the third base station does not support sidelink relay operation.

In some examples, the sidelink relay manager 825 may be configured as or otherwise support a means for receiving, from the first base station, an indication that the third base station does not support sidelink relay operation, where the determining is based on the indication that the third base station does not support sidelink relay operation.

In some examples, the sidelink relay manager 825 may be configured as or otherwise support a means for determining a sidelink relay configuration associated with the first base station. In some examples, the discovery procedure manager 855 may be configured as or otherwise support a means for performing a discovery procedure based on the determined sidelink relay configuration, where performing the handover procedure is based on performing the discovery procedure.

In some examples, the SIB message receiving manager 850 may be configured as or otherwise support a means for receiving a system information block message from the first base station, where determining the sidelink relay configuration associated with the first base station is based on the system information block message.

In some examples, the one or more candidate base stations support sidelink relay operation by supporting sidelink relay discovery procedures, sidelink relay transmissions, or both.

In some examples, the base station communicating manager 845 may be configured as or otherwise support a means for communicating with the second base station within a first frequency range. In some examples, the sidelink relay manager 825 may be configured as or otherwise support a means for determining a third base station supports sidelink relay operation within a second frequency range which is different from the first frequency range. In some examples, the sidelink relay manager 825 may be configured as or otherwise support a means for determining a sidelink relay configuration associated with the third base station based on the third base station supporting sidelink relay operation within the second frequency range. In some examples, the discovery procedure manager 855 may be configured as or otherwise support a means for performing a discovery procedure associated with the third base station in accordance with the sidelink relay configuration.

In some examples, the sidelink relay manager 825 may be configured as or otherwise support a means for receiving sidelink relay configuration. In some examples, the base station communicating manager 845 may be configured as or otherwise support a means for communicating with the second base station within a first frequency range. In some examples, the base station communicating manager 845 may be configured as or otherwise support a means for determining an absence of base stations configured to communicate within a second frequency range which is different from the first frequency range. In some examples, the discovery procedure manager 855 may be configured as or otherwise support a means for performing a discovery procedure within the second frequency range and in accordance with the sidelink relay configuration.

Additionally, or alternatively, the communications manager 820 may support wireless communication at a second UE in accordance with examples as disclosed herein. The base station communicating manager 845 may be configured as or otherwise support a means for communicating with a first base station via a first UE configured to relay wireless communications between the second UE and the first base station via at least a sidelink communication link with the first UE. In some examples, the handover command receiving manager 835 may be configured as or otherwise support a means for receiving instructions to perform a handover procedure from the first base station to a second base station based on the second base station supporting sidelink relay operation. In some examples, the handover procedure manager 840 may be configured as or otherwise support a means for performing the handover procedure to establish wireless communications with the second base station based on the instructions.

In some examples, the measurement report transmitting manager 830 may be configured as or otherwise support a means for transmitting, to the first base station via the first UE, a measurement report for one or more candidate base stations, the measurement report indicating that the one or more candidate base stations support sidelink relay operation, where performing the handover procedure is based on transmitting the measurement report.

In some examples, the SIB message receiving manager 850 may be configured as or otherwise support a means for receiving a system information block message from at least one candidate base station of the one or more candidate base stations. In some examples, the sidelink relay manager 825 may be configured as or otherwise support a means for determining, based on the system information block message, that the at least one base station supports sidelink relay operation, where the second UE transmits the measurement report based on determining that the at least one candidate base station supports support sidelink relay operation.

In some examples, the SIB message receiving manager 850 may be configured as or otherwise support a means for receiving, via the system information block message, one or more bit field values indicating that the at least one candidate base station supports sidelink relay operation, where the determining is based on the one or more bit field values.

In some examples, the sidelink relay manager 825 may be configured as or otherwise support a means for determining that a third base station does not support sidelink relay operation, where transmitting the measurement report, performing the handover procedure, or both, is based on determining that the third base station does not support sidelink relay operation.

In some examples, the SIB message receiving manager 850 may be configured as or otherwise support a means for receiving, from the third base station, a system information block message, where determining that the third base station does not support sidelink relay operation is based on the system information block message.

In some examples, determining that the third base station does not support sidelink relay operation is based on identifying one or more bit fields within the system information block message indicating that the third base station does not support sidelink relay operation, identifying an absence of data within the system information block message which indicates that the third base station supports sidelink relay operation, or both.

In some examples, the measurement report omits measurements for the third base station based on the third base station not supporting sidelink relay operation. In some examples, performing the handover procedure with the second base station is based on the measurement report omitting measurements for the third base station.

In some examples, the RRC message receiving manager 875 may be configured as or otherwise support a means for receiving, from the first base station via the first UE, a radio resource control message indicating for the second UE to omit measurements associated with base stations which do not support sidelink relay operation, where the second UE omits the measurements for the third base station based on the radio resource control message.

In some examples, the PCF message receiving manager 880 may be configured as or otherwise support a means for receiving a policy control function message indicating for the second UE to omit measurements associated with base stations which do not support sidelink relay operation, where the second UE omits the measurements for the third base station based on the policy control function message.

In some examples, to support transmitting the measurement report, the measurement report transmitting manager 830 may be configured as or otherwise support a means for transmitting measurements for the third base station via the measurement report, where the measurement report includes an indication that the third base station does not support sidelink relay operation, where performing the handover procedure with the second base station is based on the indication that the third base station does not support sidelink relay operation.

In some examples, the sidelink relay manager 825 may be configured as or otherwise support a means for receiving, from the first base station via the first UE, an indication that the third base station does not support sidelink relay operation, where the determining is based on the indication that the third base station does not support sidelink relay operation.

In some examples, the base station communicating manager 845 may be configured as or otherwise support a means for determining that a third base station is not associated with UEs which are configured to relay wireless communions between the third base station and one or more additional UEs. In some examples, the measurement report transmitting manager 830 may be configured as or otherwise support a means for transmitting the measurement report where the measurement report omits measurements for the third base station based on determining that the third base station is not associated with UEs which are configured to relay wireless communions between the third base station and the one or more additional UEs.

In some examples, the measurement report transmitting manager 830 may be configured as or otherwise support a means for transmitting, via the measurement report, an indication of a priority associated with base stations which support sidelink relay operation, where performing the handover procedure is based on the priority.

In some examples, the sidelink relay manager 825 may be configured as or otherwise support a means for determining a sidelink relay configuration associated with the first base station. In some examples, the discovery procedure manager 855 may be configured as or otherwise support a means for performing a discovery procedure based on the determined sidelink relay configuration, where performing the handover procedure is based on performing the discovery procedure.

In some examples, the SIB message receiving manager 850 may be configured as or otherwise support a means for receiving a system information block message from the first base station, where determining the sidelink relay configuration associated with the first base station is based on the system information block message.

In some examples, the handover request transmitting manager 860 may be configured as or otherwise support a means for transmitting, to a third base station, a handover request for a second handover procedure from the first base station to the third base station, where the third base station does not support sidelink relay operation. In some examples, the control message receiving manager 865 may be configured as or otherwise support a means for receiving, from the third base station, a control message rejecting the handover request, where performing the handover procedure from the first base station to the second base station is based on receiving the control message.

In some examples, the reselection procedure manager 870 may be configured as or otherwise support a means for performing a relay UE reselection procedure from the first UE to a third UE. In some examples, the base station communicating manager 845 may be configured as or otherwise support a means for communicating with the first base station via the third UE based on performing the relay UE reselection procedure, where the third UE is configured to relay wireless communications between the second UE and the first base station via at least a sidelink communication link between the first UE and the third UE.

In some examples, the second base station supports sidelink relay operation by supporting sidelink relay discovery procedures, sidelink relay transmissions, or both.

In some examples, the base station communicating manager 845 may be configured as or otherwise support a means for communicating with the second base station within a first frequency range. In some examples, the sidelink relay manager 825 may be configured as or otherwise support a means for determining a third base station supports sidelink relay operation within a second frequency range which is different from the first frequency range. In some examples, the sidelink relay manager 825 may be configured as or otherwise support a means for determining a sidelink relay configuration associated with the third base station based on the third base station supporting sidelink relay operation within the second frequency range. In some examples, the discovery procedure manager 855 may be configured as or otherwise support a means for performing a discovery procedure associated with the third base station in accordance with the sidelink relay configuration.

In some examples, the sidelink relay manager 825 may be configured as or otherwise support a means for receiving sidelink relay configuration. In some examples, the base station communicating manager 845 may be configured as or otherwise support a means for communicating with the second base station within a first frequency range. In some examples, the base station communicating manager 845 may be configured as or otherwise support a means for determining an absence of base stations configured to communicate within a second frequency range which is different from the first frequency range. In some examples, the discovery procedure manager 855 may be configured as or otherwise support a means for performing a discovery procedure within the second frequency range and in accordance with the sidelink relay configuration.

Figure 9:
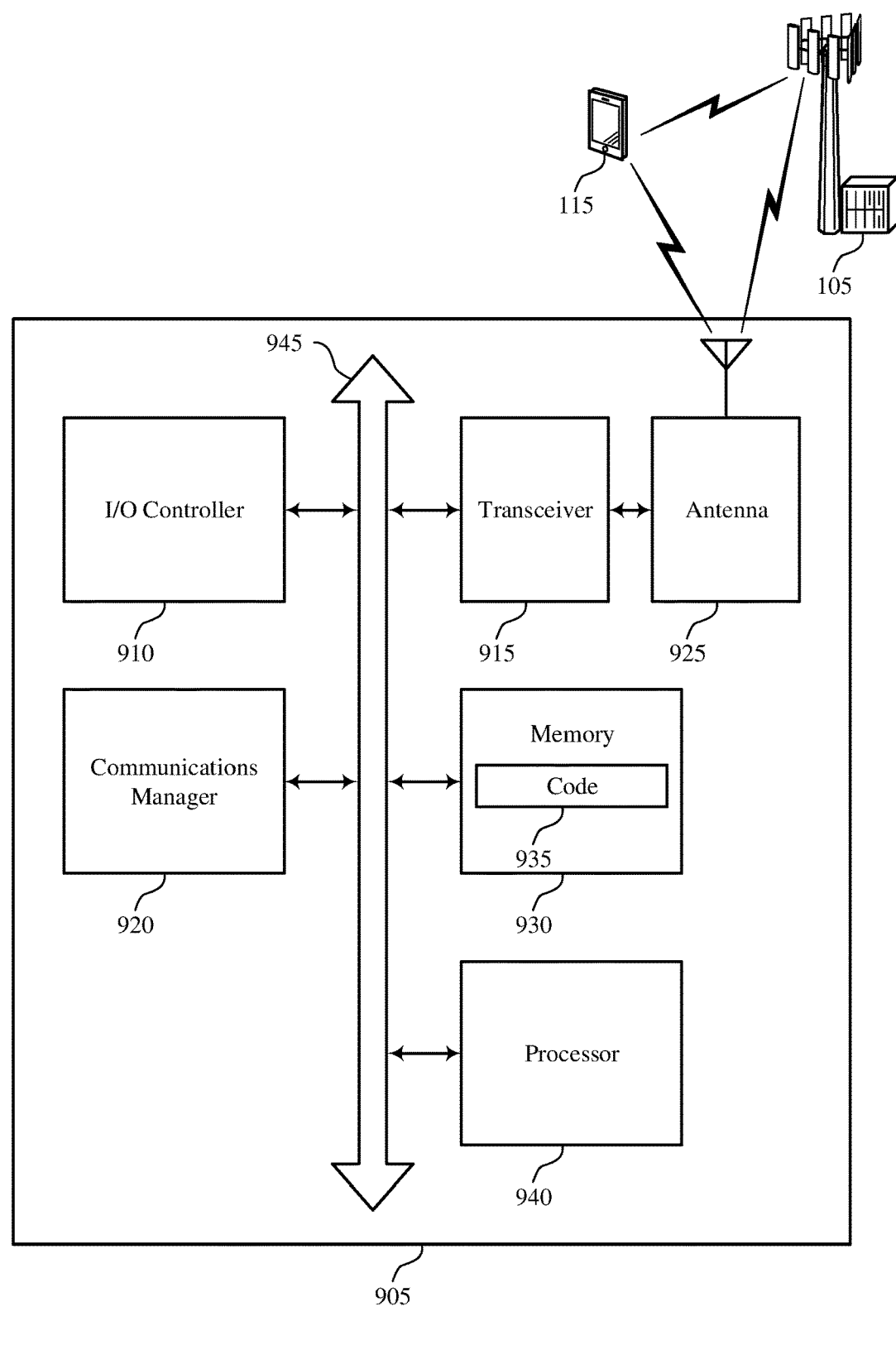
FIG. 9 shows a diagram of a system including a device that supports techniques for sidelink relay handover procedure in accordance with aspects of the present disclosure.

FIG. 9 shows a diagram of a system 900 including a device 905 that supports techniques for sidelink relay handover procedure in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for sidelink relay handover procedure). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for relaying wireless communications between a first base station and a second UE via at least a sidelink communication link with the second UE. The communications manager 920 may be configured as or otherwise support a means for transmitting, to the first base station, a measurement report for one or more candidate base stations, the measurement report indicating that the one or more candidate base stations support sidelink relay operation. The communications manager 920 may be configured as or otherwise support a means for receiving instructions to perform a handover procedure from the first base station to a second base station of the one or more candidate base stations based on the measurement report, where the second base station supports sidelink relay operation. The communications manager 920 may be configured as or otherwise support a means for performing the handover procedure including establishing a wireless connection with the second base station based on the instructions.

Additionally, or alternatively, the communications manager 920 may support wireless communication at a second UE in accordance with examples as disclosed herein. For example, the communications manager 920 may be configured as or otherwise support a means for communicating with a first base station via a first UE configured to relay wireless communications between the second UE and the first base station via at least a sidelink communication link with the first UE. The communications manager 920 may be configured as or otherwise support a means for receiving instructions to perform a handover procedure from the first base station to a second base station based on the second base station supporting sidelink relay operation. The communications manager 920 may be configured as or otherwise support a means for performing the handover procedure to establish wireless communications with the second base station based on the instructions.

By including or configuring the communications manager 920 in accordance with examples as described herein, the device 905 may support techniques for improved handover procedures for both remote UEs 115 and relay UEs 115 in the context of wireless communications systems. In particular, techniques described herein may enable UEs 115 (e.g., relay UEs 115, remote UEs 115) to determine whether base stations 105 support sidelink relay operation or not, which may enable more informed decisions regarding handover procedures. By enabling UEs 115 to determine whether base stations 105 support sidelink relay operation, techniques described herein may enable UEs 115 to perform handover procedures with base stations which support sidelink relay operation, thereby providing for more widespread use of sidelink relays and reducing power consumption at remote UEs 115.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for sidelink relay handover procedure as described herein, or the processor 940 and the memory 930 may be otherwise configured to perform or support such operations.

FIG. 10 shows a flowchart illustrating a method 1000 that supports techniques for sidelink relay handover procedure in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include relaying wireless communications between a first base station and a second UE via at least a sidelink communication link with the second UE. The operations of 1005 may be performed in accordance with examples as disclosed herein. In some examples, aspects of the operations of 1005 may be performed by a sidelink relay manager 825 as described with reference to FIG. 8.

At 1010, the method may include transmitting, to the first base station, a measurement report for one or more candidate base stations, the measurement report indicating that the one or more candidate base stations support sidelink relay operation. The operations of 1010 may be performed in accordance with examples as disclosed herein. In some examples, aspects of the operations of 1010 may be performed by a measurement report transmitting manager 830 as described with reference to FIG. 8.

At 1015, the method may include receiving instructions to perform a handover procedure from the first base station to a second base station of the one or more candidate base stations based on the measurement report, where the second base station supports sidelink relay operation. The operations of 1015 may be performed in accordance with examples as disclosed herein. In some examples, aspects of the operations of 1015 may be performed by a handover command receiving manager 835 as described with reference to FIG. 8.

At 1020, the method may include performing the handover procedure including establishing a wireless connection with the second base station based on the instructions. The operations of 1020 may be performed in accordance with examples as disclosed herein. In some examples, aspects of the operations of 1020 may be performed by a handover procedure manager 840 as described with reference to FIG. 8.

Figure 11:
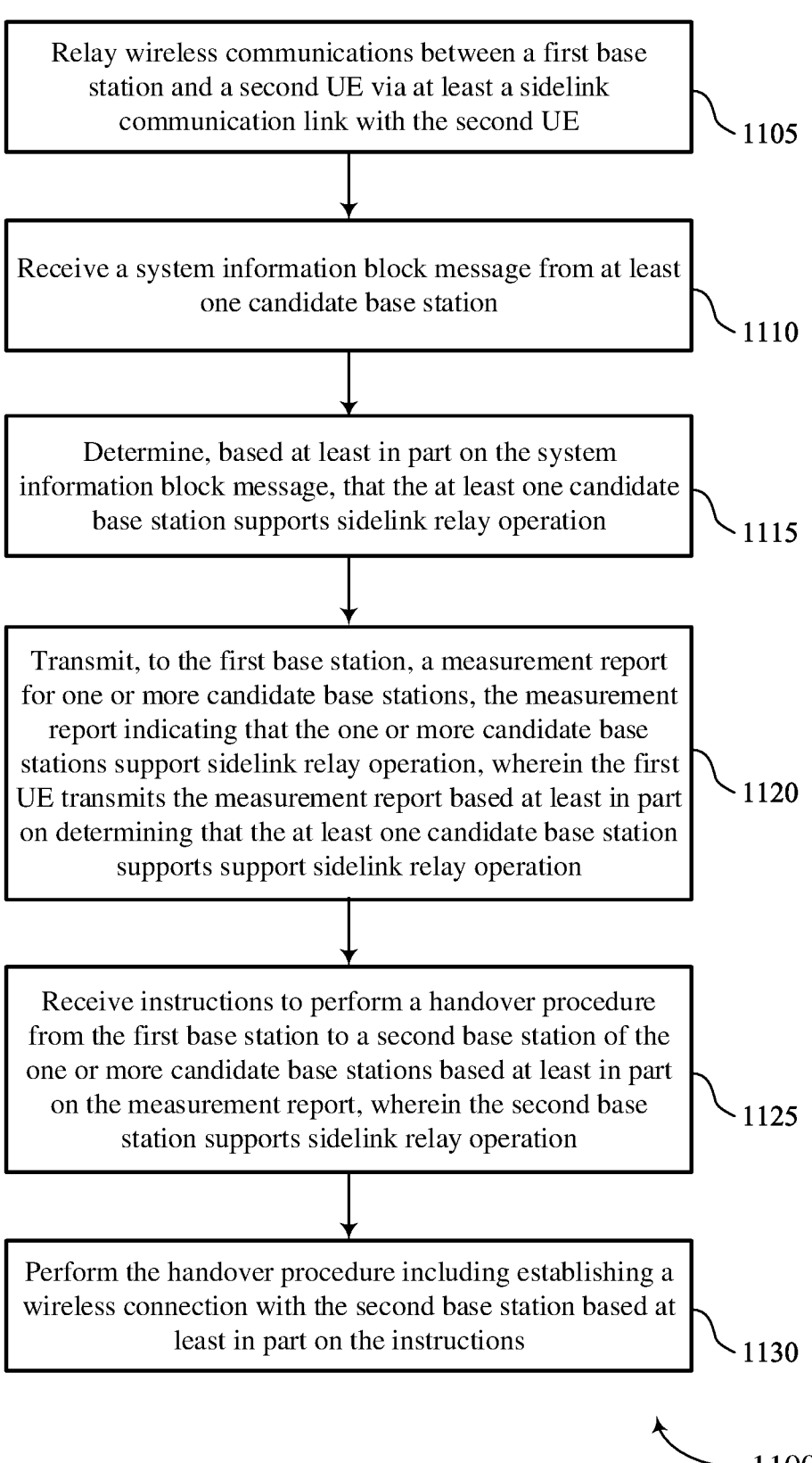

FIG. 11 shows a flowchart illustrating a method 1100 that supports techniques for sidelink relay handover procedure in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include relaying wireless communications between a first base station and a second UE via at least a sidelink communication link with the second UE. The operations of 1105 may be performed in accordance with examples as disclosed herein. In some examples, aspects of the operations of 1105 may be performed by a sidelink relay manager 825 as described with reference to FIG. 8.

At 1110, the method may include receiving a system information block message from at least one candidate base station of the one or more candidate base stations. The operations of 1110 may be performed in accordance with examples as disclosed herein. In some examples, aspects of the operations of 1110 may be performed by an SIB message receiving manager 850 as described with reference to FIG. 8.

At 1115, the method may include determining, based on the system information block message, that the at least one candidate base station supports sidelink relay operation. The operations of 1115 may be performed in accordance with examples as disclosed herein. In some examples, aspects of the operations of 1115 may be performed by a sidelink relay manager 825 as described with reference to FIG. 8.

At 1120, the method may include transmitting, to the first base station, a measurement report for one or more candidate base stations, the measurement report indicating that the one or more candidate base stations support sidelink relay operation, where the first UE transmits the measurement report based on determining that the at least one candidate base station supports support sidelink relay operation. The operations of 1120 may be performed in accordance with examples as disclosed herein. In some examples, aspects of the operations of 1120 may be performed by a measurement report transmitting manager 830 as described with reference to FIG. 8.

At 1125, the method may include receiving instructions to perform a handover procedure from the first base station to a second base station of the one or more candidate base stations based on the measurement report, where the second base station supports sidelink relay operation. The operations of 1125 may be performed in accordance with examples as disclosed herein. In some examples, aspects of the operations of 1125 may be performed by a handover command receiving manager 835 as described with reference to FIG. 8.

At 1130, the method may include performing the handover procedure including establishing a wireless connection with the second base station based on the instructions. The operations of 1130 may be performed in accordance with examples as disclosed herein. In some examples, aspects of the operations of 1130 may be performed by a handover procedure manager 840 as described with reference to FIG. 8.

FIG. 12 shows a flowchart illustrating a method 1200 that supports techniques for sidelink relay handover procedure in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include communicating with a first base station via a first UE configured to relay wireless communications between the second UE and the first base station via at least a sidelink communication link with the first UE. The operations of 1205 may be performed in accordance with examples as disclosed herein. In some examples, aspects of the operations of 1205 may be performed by a base station communicating manager 845 as described with reference to FIG. 8.

At 1210, the method may include receiving instructions to perform a handover procedure from the first base station to a second base station based on the second base station supporting sidelink relay operation. The operations of 1210 may be performed in accordance with examples as disclosed herein. In some examples, aspects of the operations of 1210 may be performed by a handover command receiving manager 835 as described with reference to FIG. 8.

At 1215, the method may include performing the handover procedure to establish wireless communications with the second base station based on the instructions. The operations of 1215 may be performed in accordance with examples as disclosed herein. In some examples, aspects of the operations of 1215 may be performed by a handover procedure manager 840 as described with reference to FIG. 8.

The following provides an overview of aspects of the present disclosure:

Aspect 1: A method for wireless communication at a first UE, comprising: relaying wireless communications between a first base station and a second UE via at least a sidelink communication link with the second UE; transmitting, to the first base station, a measurement report for one or more candidate base stations, the measurement report indicating that the one or more candidate base stations support sidelink relay operation; receiving instructions to perform a handover procedure from the first base station to a second base station of the one or more candidate base stations based at least in part on the measurement report, wherein the second base station supports sidelink relay operation; and performing the handover procedure including establishing a wireless connection with the second base station based at least in part on the instructions.

Aspect 2: The method of aspect 1, further comprising: receiving a SIB message from at least one candidate base station of the one or more candidate base stations; and determining, based at least in part on the SIB message, that the at least one candidate base station supports sidelink relay operation, wherein the first UE transmits the measurement report based at least in part on determining that the at least one candidate base station supports support sidelink relay operation.

Aspect 3: The method of aspect 2, further comprising: receiving, via the SIB message, one or more bit field values indicating that the at least one candidate base station supports sidelink relay operation, wherein the determining is based at least in part on the one or more bit field values.

Aspect 4: The method of any of aspects 1 through 3, further comprising: determining that a third base station does not support sidelink relay operation, wherein transmitting the measurement report, performing the handover procedure, or both, is based at least in part on determining that the third base station does not support sidelink relay operation.

Aspect 5: The method of aspect 4, further comprising: receiving, from the third base station, a SIB message, wherein determining that the third base station does not support sidelink relay operation is based at least in part on the SIB message.

Aspect 6: The method of aspect 5, wherein determining that the third base station does not support sidelink relay operation is based at least in part on identifying one or more bit fields within the SIB message indicating that the third base station does not support sidelink relay operation, identifying an absence of data within the SIB message which indicates that the third base station supports sidelink relay operation, or both.

Aspect 7: The method of any of aspects 4 through 6, wherein the measurement report omits measurements for the third base station based at least in part on the third base station not supporting sidelink relay operation, performing the handover procedure with the second base station is based at least in part on the measurement report omitting measurements for the third base station.

Aspect 8: The method of aspect 7, further comprising: receiving, from the first base station, an RRC message indicating for the first UE to omit measurements associated with base stations which do not support sidelink relay operation, wherein the first UE omits the measurements for the third base station based at least in part on the RRC message.

Aspect 9: The method of any of aspects 4 through 8, wherein transmitting the measurement report comprises: transmitting measurements for the third base station via the measurement report, wherein the measurement report comprises an indication that the third base station does not support sidelink relay operation, wherein performing the handover procedure with the second base station is based at least in part on the indication that the third base station does not support sidelink relay operation.

Aspect 10: The method of any of aspects 4 through 9, further comprising: receiving, from the first base station, an indication that the third base station does not support sidelink relay operation, wherein the determining is based at least in part on the indication that the third base station does not support sidelink relay operation.

Aspect 11: The method of any of aspects 1 through 10, further comprising: determining a sidelink relay configuration associated with the first base station; and performing a discovery procedure based at least in part on the determined sidelink relay configuration, wherein performing the handover procedure is based at least in part on performing the discovery procedure.

Aspect 12: The method of aspect 11, further comprising: receiving a SIB message from the first base station, wherein determining the sidelink relay configuration associated with the first base station is based at least in part on the SIB message.

Aspect 13: The method of any of aspects 1 through 12, wherein the one or more candidate base stations support sidelink relay operation by supporting sidelink relay discovery procedures, sidelink relay transmissions, or both.

Aspect 14: The method of any of aspects 1 through 13, further comprising: communicating with the second base station within a first frequency range; determining a third base station supports sidelink relay operation within a second frequency range which is different from the first frequency range; determining a sidelink relay configuration associated with the third base station based at least in part on the third base station supporting sidelink relay operation within the second frequency range; and performing a discovery procedure associated with the third base station in accordance with the sidelink relay configuration.

Aspect 15: The method of any of aspects 1 through 14, further comprising: receiving sidelink relay configuration; communicating with the second base station within a first frequency range; determining an absence of base stations configured to communicate within a second frequency range which is different from the first frequency range; and performing a discovery procedure within the second frequency range and in accordance with the sidelink relay configuration Aspect 16: A method for wireless communication at a second UE, comprising: communicating with a first base station via a first UE configured to relay wireless communications between the second UE and the first base station via at least a sidelink communication link with the first UE; receiving instructions to perform a handover procedure from the first base station to a second base station based at least in part on the second base station supporting sidelink relay operation; and performing the handover procedure to establish wireless communications with the second base station based at least in part on the instructions.

Aspect 17: The method of aspect 16, further comprising: transmitting, to the first base station via the first UE, a measurement report for one or more candidate base stations, the measurement report indicating that the one or more candidate base stations support sidelink relay operation, wherein performing the handover procedure is based at least in part on transmitting the measurement report.

Aspect 18: The method of aspect 17, further comprising: receiving a SIB message from at least one candidate base station of the one or more candidate base stations; and determining, based at least in part on the SIB message, that the at least one base station supports sidelink relay operation, wherein the second UE transmits the measurement report based at least in part on determining that the at least one candidate base station supports support sidelink relay operation.

Aspect 19: The method of aspect 18, further comprising: receiving, via the SIB message, one or more bit field values indicating that the at least one candidate base station supports sidelink relay operation, wherein the determining is based at least in part on the one or more bit field values.

Aspect 20: The method of any of aspects 17 through 19, further comprising: determining that a third base station does not support sidelink relay operation, wherein transmitting the measurement report, performing the handover procedure, or both, is based at least in part on determining that the third base station does not support sidelink relay operation.

Aspect 21: The method of aspect 20, further comprising: receiving, from the third base station, a SIB message, wherein determining that the third base station does not support sidelink relay operation is based at least in part on the SIB message.

Aspect 22: The method of aspect 21, wherein determining that the third base station does not support sidelink relay operation is based at least in part on identifying one or more bit fields within the SIB message indicating that the third base station does not support sidelink relay operation, identifying an absence of data within the SIB message which indicates that the third base station supports sidelink relay operation, or both.

Aspect 23: The method of any of aspects 20 through 22, wherein the measurement report omits measurements for the third base station based at least in part on the third base station not supporting sidelink relay operation, performing the handover procedure with the second base station is based at least in part on the measurement report omitting measurements for the third base station.

Aspect 24: The method of aspect 23, further comprising: receiving, from the first base station via the first UE, an RRC message indicating for the second UE to omit measurements associated with base stations which do not support sidelink relay operation, wherein the second UE omits the measurements for the third base station based at least in part on the RRC message.

Aspect 25: The method of any of aspects 23 through 24, further comprising: receiving a policy control function message indicating for the second UE to omit measurements associated with base stations which do not support sidelink relay operation, wherein the second UE omits the measurements for the third base station based at least in part on the policy control function message.

Aspect 26: The method of any of aspects 20 through 25, wherein transmitting the measurement report comprises: transmitting measurements for the third base station via the measurement report, wherein the measurement report comprises an indication that the third base station does not support sidelink relay operation, wherein performing the handover procedure with the second base station is based at least in part on the indication that the third base station does not support sidelink relay operation.

Aspect 27: The method of any of aspects 20 through 26, further comprising: receiving, from the first base station via the first UE, an indication that the third base station does not support sidelink relay operation, wherein the determining is based at least in part on the indication that the third base station does not support sidelink relay operation.

Aspect 28: The method of any of aspects 17 through 27, further comprising: determining that a third base station is not associated with UEs which are configured to relay wireless communions between the third base station and one or more additional UEs; and transmitting the measurement report where the measurement report omits measurements for the third base station based at least in part on determining that the third base station is not associated with UEs which are configured to relay wireless communions between the third base station and the one or more additional UEs.

Aspect 29: The method of any of aspects 17 through 28, further comprising: transmitting, via the measurement report, an indication of a priority associated with base stations which support sidelink relay operation, wherein performing the handover procedure is based at least in part on the priority.

Aspect 30: The method of any of aspects 16 through 29, further comprising: determining a sidelink relay configuration associated with the first base station; and performing a discovery procedure based at least in part on the determined sidelink relay configuration, wherein performing the handover procedure is based at least in part on performing the discovery procedure.

Aspect 31: The method of aspect 30, further comprising: receiving a SIB message from the first base station, wherein determining the sidelink relay configuration associated with the first base station is based at least in part on the SIB message.

Aspect 32: The method of any of aspects 16 through 31, further comprising: transmitting, to a third base station, a handover request for a second handover procedure from the first base station to the third base station, wherein the third base station does not support sidelink relay operation; and receiving, from the third base station, a control message rejecting the handover request, wherein performing the handover procedure from the first base station to the second base station is based at least in part on receiving the control message.

Aspect 33: The method of any of aspects 16 through 32, further comprising: performing a relay UE reselection procedure from the first UE to a third UE; and communicating with the first base station via the third UE based at least in part on performing the relay UE reselection procedure, wherein the third UE is configured to relay wireless communications between the second UE and the first base station via at least a sidelink communication link between the first UE and the third UE.

Aspect 34: The method of any of aspects 16 through 33, wherein the second base station supports sidelink relay operation by supporting sidelink relay discovery procedures, sidelink relay transmissions, or both.

Aspect 35: The method of any of aspects 16 through 34, further comprising: communicating with the second base station within a first frequency range; determining a third base station supports sidelink relay operation within a second frequency range which is different from the first frequency range; determining a sidelink relay configuration associated with the third base station based at least in part on the third base station supporting sidelink relay operation within the second frequency range; and performing a discovery procedure associated with the third base station in accordance with the sidelink relay configuration.

Aspect 36: The method of any of aspects 16 through 35, further comprising: receiving sidelink relay configuration; communicating with the second base station within a first frequency range; determining an absence of base stations configured to communicate within a second frequency range which is different from the first frequency range; and performing a discovery procedure within the second frequency range and in accordance with the sidelink relay configuration.

Aspect 37: An apparatus for wireless communication at a first UE, comprising a processor; memory coupled with the processor; and instructions stored in the memory and executable by the processor to cause the apparatus to perform a method of any of aspects 1 through 15.

Aspect 38: An apparatus for wireless communication at a first UE, comprising at least one means for performing a method of any of aspects 1 through 15.

Aspect 39: A non-transitory computer-readable medium storing code for wireless communication at a first UE, the code comprising instructions executable by a processor to perform a method of any of aspects 1 through 15.

Aspect 40: An apparatus for wireless communication at a second UE, comprising a processor; memory coupled with the processor; and instructions stored in the memory and executable by the processor to cause the apparatus to perform a method of any of aspects 16 through 36.

Aspect 41: An apparatus for wireless communication at a second UE, comprising at least one means for performing a method of any of aspects 16 through 36.

Aspect 42: A non-transitory computer-readable medium storing code for wireless communication at a second UE, the code comprising instructions executable by a processor to perform a method of any of aspects 16 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

relaying wireless communications between a first base station and a second UE via at least a sidelink communication link with the second UE;

transmitting, to the first base station, a measurement report for one or more candidate base stations, the measurement report indicating that the one or more candidate base stations support sidelink relay operation;

receiving instructions to perform a handover procedure from the first base station to a second base station of the one or more candidate base stations based at least in part on the measurement report, wherein the second base station supports sidelink relay operation;

performing the handover procedure including establishing a wireless connection with the second base station based at least in part on the instructions; and determining that a third base station does not support sidelink relay operation, wherein transmitting the measurement report, performing the handover procedure, or both, is based at least in part on determining that the third base station does not support sidelink relay operation, wherein the measurement report omits measurements for the third base station based at least in part on the third base station not supporting sidelink relay operation, performing the handover procedure with the second base station is based at least in part on the measurement report omitting measurements for the third base station.

2. The method of claim 1, further comprising:

receiving a system information block message from at least one candidate base station of the one or more candidate base stations; and determining, based at least in part on the system information block message, that the at least one base station supports sidelink relay operation, wherein the first UE transmits the measurement report based at least in part on determining that the at least one candidate base station supports sidelink relay operation.

3. The method of claim 2, further comprising:

receiving, via the system information block message, one or more bit field values indicating that the at least one candidate base station supports sidelink relay operation, wherein the determining is based at least in part on the one or more bit field values.

4. The method of claim 1, further comprising:

receiving, from the third base station, a system information block message, wherein determining that the third base station does not support sidelink relay operation is based at least in part on the system information block message.

5. The method of claim 4, wherein determining that the third base station does not support sidelink relay operation is based at least in part on identifying one or more bit fields within the system information block message indicating that the third base station does not support sidelink relay operation, identifying an absence of data within the system information block message which indicates that the third base station supports sidelink relay operation, or both.

6. The method of claim 1, further comprising:

receiving, from the first base station, a radio resource control message indicating for the first UE to omit measurements associated with base stations which do not support sidelink relay operation, wherein the first UE omits the measurements for the third base station based at least in part on the radio resource control message.

7. The method of claim 1, wherein transmitting the measurement report comprises:

transmitting measurements for the third base station via the measurement report, wherein the measurement report comprises an indication that the third base station does not support sidelink relay operation, wherein performing the handover procedure with the second base station is based at least in part on the indication that the third base station does not support sidelink relay operation.

8. The method of claim 1, further comprising:

receiving, from the first base station, an indication that the third base station does not support sidelink relay operation, wherein the determining is based at least in part on the indication that the third base station does not support sidelink relay operation.

9. The method of claim 1, further comprising:

determining a sidelink relay configuration associated with the first base station; and performing a discovery procedure based at least in part on the determined sidelink relay configuration, wherein performing the handover procedure is based at least in part on performing the discovery procedure.

10. The method of claim 9, further comprising:

receiving a system information block message from the first base station, wherein determining the sidelink relay configuration associated with the first base station is based at least in part on the system information block message.

11. The method of claim 1, wherein the one or more candidate base stations support sidelink relay operation by supporting sidelink relay discovery procedures, sidelink relay transmissions, or both.

12. A method for wireless communication at a second user equipment (UE), comprising:

communicating with a first base station via a first UE configured to relay wireless communications between the second UE and the first base station via at least a sidelink communication link with the first UE;

receiving instructions to perform a handover procedure from the first base station to a second base station based at least in part on the second base station supporting sidelink relay operation;

performing the handover procedure to establish wireless communications with the second base station based at least in part on the instructions;

transmitting, to a third base station, a handover request for a second handover procedure from the first base station to the third base station, wherein the third base station does not support sidelink relay operation; and receiving, from the third base station, a control message rejecting the handover request, wherein performing the handover procedure from the first base station to the second base station is based at least in part on receiving the control message.

13. The method of claim 12, further comprising:
transmitting, to the first base station via the first UE, a measurement report for one or more candidate base stations, the measurement report indicating that the one or more candidate base stations support sidelink relay operation, wherein performing the handover procedure is based at least in part on transmitting the measurement report.

14. The method of claim 13, further comprising:
receiving a system information block message from at least one candidate base station of the one or more candidate base stations; and determining, based at least in part on the system information block message, that the at least one base station supports sidelink relay operation, wherein the second UE transmits the measurement report based at least in part on determining that the at least one candidate base station supports support sidelink relay operation.

15. The method of claim 14, further comprising:
receiving, via the system information block message, one or more bit field values indicating that the at least one candidate base station supports sidelink relay operation, wherein the determining is based at least in part on the one or more bit field values.

16. The method of claim 13, further comprising:
determining that a third base station does not support sidelink relay operation, wherein transmitting the measurement report, performing the handover procedure, or both, is based at least in part on determining that the third base station does not support sidelink relay operation.

17. The method of claim 16, further comprising:
receiving, from the third base station, a system information block message, wherein determining that the third base station does not support sidelink relay operation is based at least in part on the system information block message.

18. The method of claim 16, wherein the measurement report omits measurements for the third base station based at least in part on the third base station not supporting sidelink relay operation, the method further comprising:
performing the handover procedure with the second base station is based at least in part on the measurement report omitting measurements for the third base station.

19. The method of claim 18, further comprising:
receiving, from the first base station via the first UE, a radio resource control message indicating for the second UE to omit measurements associated with base stations which do not support sidelink relay operation, wherein the second UE omits the measurements for the third base station based at least in part on the radio resource control message.

20. The method of claim 18, further comprising:
receiving a policy control function message indicating for the second UE to omit measurements associated with base stations which do not support sidelink relay operation, wherein the second UE omits the measurements for the third base station based at least in part on the policy control function message.

21. The method of claim 16, wherein transmitting the measurement report comprises:
transmitting measurements for the third base station via the measurement report, wherein the measurement report comprises an indication that the third base station does not support sidelink relay operation, wherein performing the handover procedure with the second base station is based at least in part on the indication that the third base station does not support sidelink relay operation.

22. The method of claim 13, further comprising:
determining that a third base station is not associated with UEs which are configured to relay wireless communions between the third base station and one or more additional UEs; and transmitting the measurement report where the measurement report omits measurements for the third base station based at least in part on determining that the third base station is not associated with UEs which are configured to relay wireless communions between the third base station and the one or more additional UEs.

23. The method of claim 13, further comprising:
transmitting, via the measurement report, an indication of a priority associated with base stations which support sidelink relay operation, wherein performing the handover procedure is based at least in part on the priority.

24. The method of claim 12, further comprising:
determining a sidelink relay configuration associated with the first base station; and performing a discovery procedure based at least in part on the determined sidelink relay configuration, wherein performing the handover procedure is based at least in part on performing the discovery procedure.

25. The method of claim 24, further comprising:
receiving a system information block message from the first base station, wherein determining the sidelink relay configuration associated with the first base station is based at least in part on the system information block message.

26. An apparatus for wireless communication at a first user equipment (UE), comprising:
a processor;
memory coupled with the processor; and
instructions stored in the memory and executable by the processor to cause the apparatus to:
relay wireless communications between a first base station and a second UE via at least a sidelink communication link with the second UE;
transmit, to the first base station, a measurement report for one or more candidate base stations, the measurement report indicating that the one or more candidate base stations support sidelink relay configuration;
receive instructions to perform a handover procedure from the first base station to a second base station of the one or more candidate base stations based at least in part on the measurement report, wherein the second base station supports sidelink relay operation;

perform the handover procedure including establishing a wireless connection with the second base station based at least in part on the instructions; and determining that a third base station does not support sidelink relay operation, wherein transmitting the measurement report, performing the handover procedure, or both, is based at least in part on determining that the third base station does not support sidelink relay operation, wherein the measurement report omits measurements for the third base station based at least in part on the third base station not supporting sidelink relay operation, performing the handover procedure with the second base station is based at least in part on the measurement report omitting measurements for the third base station.

27. An apparatus for wireless communication at a second user equipment (UE), comprising:

a processor;

memory coupled with the processor; and instructions stored in the memory and executable by the processor to cause the apparatus to:

communicate with a first base station via a first UE configured to relay wireless communications between the second UE and the first base station via at least a sidelink communication link with the first UE;

receive instructions to perform a handover procedure from the first base station to a second base station based at least in part on the second base station supporting sidelink relay operation;

perform the handover procedure to establish wireless communications with the second base station based at least in part on the instructions;

transmit, to a third base station, a handover request for a second handover procedure from the first base station to the third base station, wherein the third base station does not support sidelink relay operation; and receive, from the third base station, a control message rejecting the handover request, wherein performing the handover procedure from the first base station to the second base station is based at least in part on receiving the control message.

*  *  *  *  *